United States Patent [19]
Ueno et al.

[11] Patent Number: 5,625,415
[45] Date of Patent: Apr. 29, 1997

[54] APPARATUS AND METHOD FOR AUTOMATIC FOCUSING IN A CAMERA SYSTEM

[75] Inventors: Hitoshi Ueno; Takeshi Misawa, both of Asaka, Japan

[73] Assignee: Fuji Photo Film Co., Ltd., Kanagawa, Japan

[21] Appl. No.: 243,795

[22] Filed: May 17, 1994

[30] Foreign Application Priority Data

May 20, 1993 [JP] Japan ................................. 5-141492
May 21, 1993 [JP] Japan ................................. 5-120103

[51] Int. Cl.$^6$ ............................................... H04N 5/232
[52] U.S. Cl. ................................... 348/350; 348/346
[58] Field of Search ................................ 348/345, 346, 348/349, 207, 362, 350, 363, 364, 312; H04N 5/232

[56] References Cited

U.S. PATENT DOCUMENTS 5,051,833  9/1991  Tsuji ........................................ 348/349
5,233,431  8/1993  Yoshida et al. ........................ 348/349
5,369,430  11/1994  Kitamura ............................... 348/345

*Primary Examiner*—John K. Peng
*Assistant Examiner*—Tuan V. Ho

[57] ABSTRACT

A processing apparatus performs a pre-shooting to beforehand photograph a camera subject for a light metering through controlling a camera. Image data representative of a pre-shot image of the object formed through the pre-shooting is subjected to a reduction processing by a camera control, and then transmitted to the processing apparatus. The pre-shot image is displayed on a predetermined area of a display unit. Area information representative of a photometric domain in the pre-shot image and a photometric method is determined in accordance with operational information of which the processing apparatus is formed by an input device. An exposure value is calculated from image data representative of the pre-shot image on the basis of the determined area information. Exposure information representative of a shutter speed and a stop corresponding to the calculated exposure value is formed. The image of the object is again photographed by the camera on the basis of the formed exposure information and the control of the processing apparatus.

11 Claims, 15 Drawing Sheets

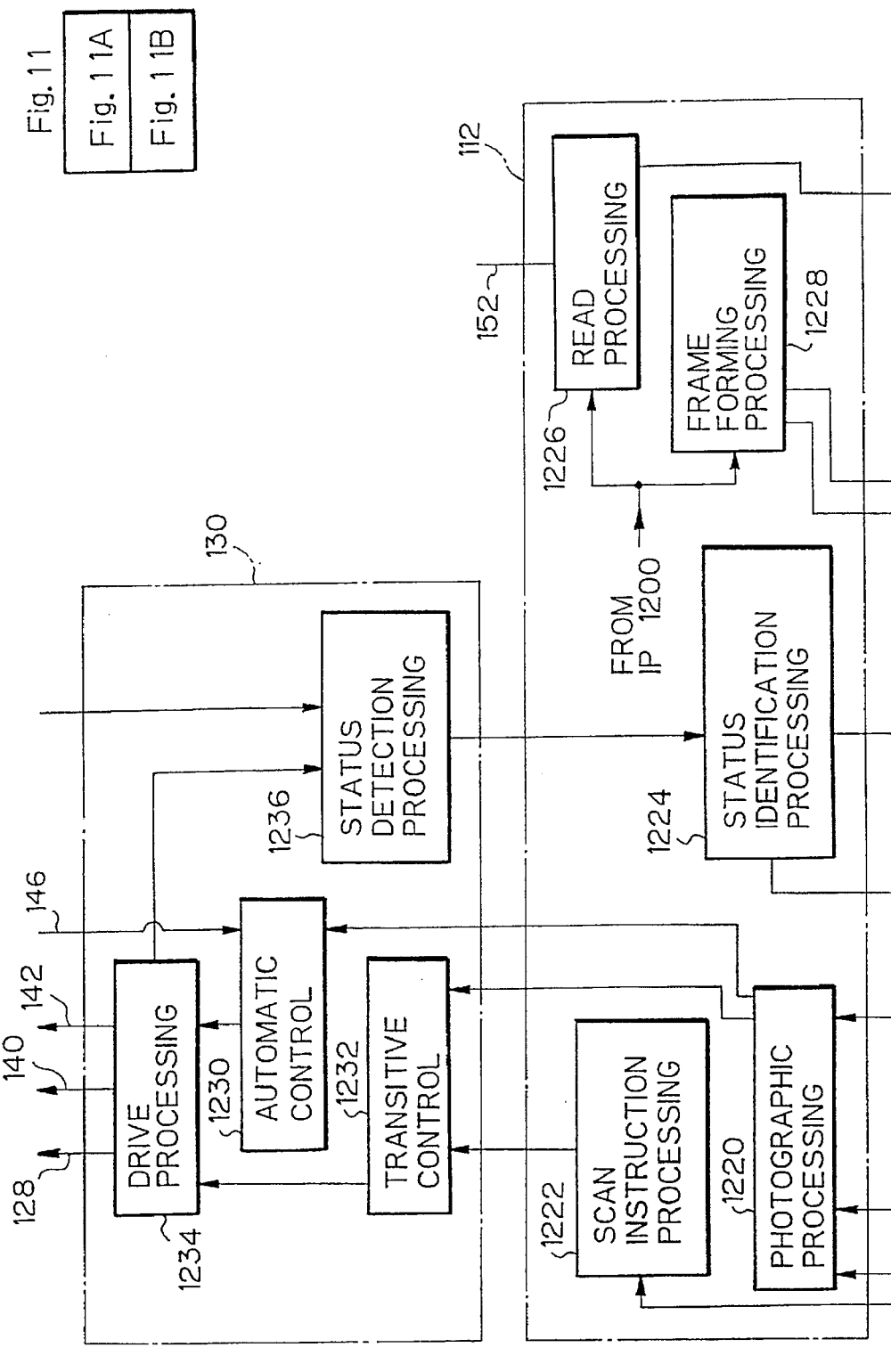

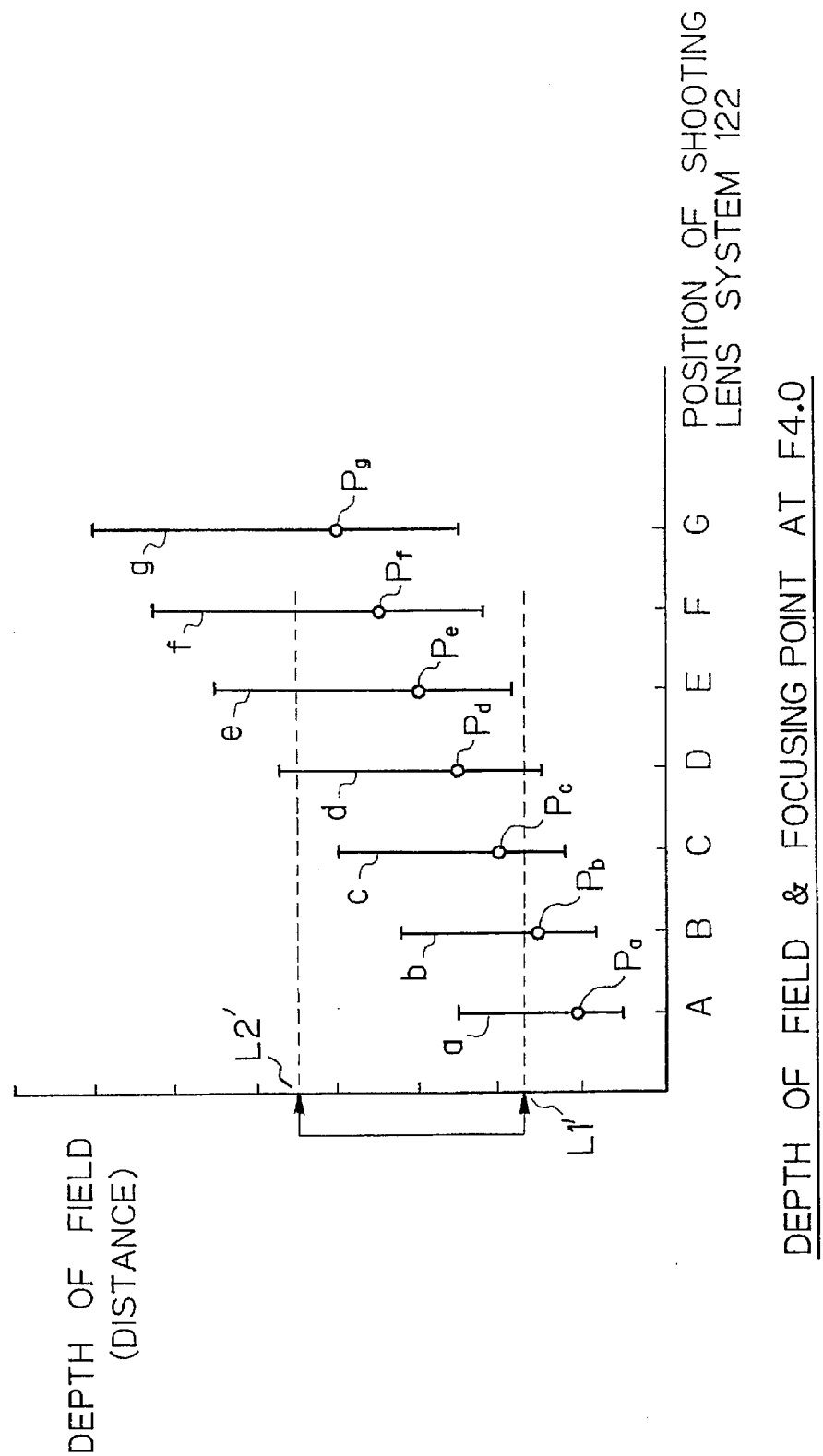

APPARATUS AND METHOD FOR AUTOMATIC FOCUSING IN A CAMERA SYSTEM

BACKGROUND OF THE INVENTION

1. Field of the Invention

The present invention relates to a camera system for picking up the image of an object and a photometric and an automatic focusing method.

2. Description of the Related Art

Hitherto, in a camera capable of forming image data representative of an image of an object, there are known various photometric schemes, such as the averaged overall light sensing scheme in which the brightness of an object and its background is measured, the center-weighted light sensing scheme, the multiple segment exposure metering scheme, etc. Some types of cameras include a system in which the light metering is conducted through selectively switching the photometric schemes in the nature of an object. The photographic conditions, such as a shutter speed and a stop value, which determine exposure for photographing of an object, are determined on the basis of photometric information obtained through light metering according to the above-mentioned manner. The image data, which is representative of the image of the object photographed on the basis of the determined photographic conditions, is subjected to a predetermined processing, such as a compression processing, etc., and then stored in an information recording medium such as an optical disc, an IC memory card, etc. Further, the image data is output to a monitor device and/or a printer device so that an image represented by the image data is displayed and/or printed.

According to the conventional light metering scheme, however, it is impossible to change a photometric zone which has been set beforehand, and also impossible to optionally select a photometric zone. For example, according to the center-weighted light sensing scheme, a priority metering of only the center of photometric zone which has been set beforehand is merely made. Further, according to the multiple segment exposure metering scheme, a selective metering of the segmented photometric zones is merely made. Consequently, according to the conventional photometric schemes, it is impossible to perform an adequate exposure metering in compliance with the content of images, since the photometric zone is fixed. Thus, according to the conventional photometric scheme, if the contrast of the object is very high, or the reflection factor of the object is remarkably different from a reference reflection factor, it is difficult to form an adequate exposure value. Further, according to the conventional photometric scheme, since the photometric zone is fixed, the position of the camera needs to be changed for every operation so that the photometric zone coincides with a photometric portion of the object as a target. Specifically, in case of photographing upon fixing of the camera on a base such as a tripod, this involves such a problem that the operation for the photometry is very complicated.

Next, with respect to the automatic focusing in the camera as mentioned above, hitherto, there are known various detection schemes, such as the contrast detection scheme in which the focusing state of an object image formed by a shooting lens system is detected, and the phase difference detection scheme, etc. The automatic focusing is concerned with a system in which any of the above-mentioned detection schemes is used to detect the focal point of the shooting lens system, and the shooting lens system is moved to a detected focal point so as to obtain an image which is in focus.

For example, in a camera adopting the contrast detection scheme in which contrast information about the object is detected from an image signal which is representative of an image formed through an image shooting, a detection zone (focusing frame or AF frame) in which the contrast information of the image of the object is detected is disposed at the center of the picture field, for example. Thus, in order to attain a focusing state of the image of the object, the position of the camera is changed by an operator in such a manner that a target portion of the object image to be focused is within the focusing frame, so that the contrast information for focusing may be detected on the basis of the pickup signal involved in the focusing frame. The shooting lens system is driven in such a manner that the maximum contrast information is derived. In this case, the focusing is locked to maintain the focusing state of the image of the object, and then the position of the camera is adjusted for framing so that a desired composition of photograph is performed. As described above, according to the conventional automatic focusing system, it is possible to implement the focusing of the image of the object, through the use of the system together with the focusing lock function.

According to the conventional automatic focusing system, however, the focusing frame for determining the focusing state is fixed, and, thus the position of the camera needs to be changed for every operation and practice the focusing lock, so that the focusing frame coincides with a target portion of the object. Hence, specifically, in case of photographing upon fixing of the camera on a base such as a tripod, and a copy stand for copying documents, the fixing of the camera needs to be restarted for every operation. Thus, the operation for focusing according to the image of the object is very complicated.

Further, for example, in the contrast detection scheme, if a plurality of focusing frames are provided for the purpose of detecting a plurality of contrast information messages, all of the plurality of contrast information messages detected by the plurality of focusing frames are not necessarily needed, and thus it is difficult to determine an optimum position of the shooting lens system. In addition, in this case, it is impossible to implement the automatic focusing in such a manner that all of the objects corresponding to the plurality of focusing frames are in focus.

The demand for higher image quality of photographed images has been increased. A high image quality of image, which is photographed by a camera adapted for photographing in high image quality, is available for printing and medical uses. Under the situation, an improvement of accuracy in focusing is desired. Nevertheless, hitherto, there has been no technology proposed that selects target portion of an object in a simple way and focuses the selected portion with great accuracy.

SUMMARY OF THE INVENTION

It is therefore an object of the present invention to provide a camera system and a photometric method capable of performing a suitable light metering according to the photographic condition.

It is another object of the present invention to provide a camera system and an automatic focusing method capable of performing a suitable automatic focusing according to the photographic condition of the object and the photographic purpose.

In accordance with a preferred embodiment of the present invention, there is disclosed a camera system for photographing an object to produce image data corresponding to a pixel signal representative of an image of the object, comprising: a pick-up device for producing the image data from an optical image representative of the object; a processing apparatus for processing the image data produced by the pick-up device through controlling the pick-up device; a display device for displaying an image represented by the image data subjected to processing by the processing apparatus; and an input device for detecting operational information input on the basis of the image displayed on the display device. The pick-up device comprises conversion device for producing pixel signals representative of an image of the object through intercepting the image of the object, a regulating device for regulating an exposure in the conversion device, and a control device for providing such a control that the regulating means and the conversion means are driven under the control of the processing apparatus so that the image of the object is photographed. The control device comprises a photographic processing device responsive to an instruction from the processing device for driving the regulating device and the conversion device, and a frame forming device responsive to an instruction from the processing devices for forming, on the basis of the pixel signal produced in the conversion device, a first image data representative of a first image which is reduced in size of an image represented by the pixel signal. The processing apparatus comprises an input processing device for identifying the operational information, a pre-shot processing device for controlling the photographic processing device and the frame forming device to issue prior to an image shooting a first image to calculate an exposure value concerning the image shooting, a display processing device for providing such a processing that the first image represented by the first image data produced in the frame forming means is displayed on the display device, area processing means for producing on the basis of the operational information area information representative of a photometric area in the first image represented by the first image data produced in the frame forming means and a photometric method, and photometric processing device for calculating the exposure value concerning the image shooting on the basis of image data involved in the area information to produce exposure information corresponding to the calculated exposure value. The photographic processing device drives the regulating device and the conversion device on the basis of the exposure information produced in the photometric processing device. The pick-up device is driven based on the exposure information and produces a second image data corresponding to the pixel signal formed in the conversion means.

Further, in accordance with an embodiment of the present invention, there is disclosed a photometric method of performing a light metering in compliance with an image of an object, in a pick-up device for producing image data representative of the image of the object, the method comprising steps of: a first photographic step of forming a first image available for a light metering; an area designation step of designating a photometric area involved in the first image; a photometric step of calculating an exposure value on the basis of the first image corresponding to the photometric area designated in the designation step; a transmitting step of transmitting exposure information concerning the exposure value to the pick-up device; and a second photographic step of forming a second image through photographing the object on the basis of the exposure information transmitted to the pick-up device in the transmitting step.

Furthermore, in accordance with an embodiment of the present invention, there is disclosed a camera system for producing image data representative of an optical image of an object incident via a shooting lens system, comprising: pick-up device for producing pixel signals representative of the optical image through photographing the object: a first control client for controlling the pick-up client and for processing the pixel signals produced in the pick-up device to generate a first image data and a second image data for focusing associated with the pixel signals; a second control unit for providing such a control that a focusing for an image of the object is implemented on the basis of the first image data, the pick-up device being controlled on the basis of information obtained through the focusing, and an instruction is transmitted to the first control unit to generate the second data; a display device for displaying a first image represented by the first image data; and an input device for detecting an operational state by an operator condition operated on the basis of the first image displayed on the display device, wherein the first control unit controls the pick-up device in accordance with the instruction informed by the second control means to photographically form the image of the object, and generates the first image data and the second image data, and the second control unit identifies operational information representative of the operational state to set up a focusing area on the first image in accordance with the operational information, and implements the focusing for the image of the object on the basis of the set up focusing area.

Still further, in accordance with an embodiment of the present invention, there is disclosed an automatic focusing method of performing a focusing in a camera for photographing an object to form an image of the object, the method comprising steps of: a first photographic step of forming a first image available for a focusing; an area setting step of setting up a focusing area involved in the first image to extract the first image corresponding to the focusing area; a focusing step of controlling the camera to identify a state of the camera in a focusing condition of the image of the object in accordance with the first image extracted in the area designation step; and a transmitting step of setting up photographic conditions for photographing the object on the basis of information representative of the state of the camera identified in the focusing step and transmitting the set up photographic conditions to the camera; and a second photographic step of forming a second image through photographing the object on the basis of the photographic conditions.

BRIEF DESCRIPTION OF THE DRAWINGS

The objects and features of the present invention will become more apparent from the consideration of the following detailed description taken in conjunction with the accompanying drawings in which:

FIG. 11 shows a combination of FIGS. 11A and 11B;

FIG. 11A and 11B are block diagrams showing, when combined as shown in FIG. 11, a functional structure of a camera control unit, a control circuit and a processing apparatus included in the camera system shown in FIG. 10;

FIG. 20 is a view illustrating another example of information as to a depth of field, which information is generated from the unit (shown in FIG. 11) for generating information involved in a depth of field.

DESCRIPTION OF THE PREFERRED EMBODIMENTS

Figure 1:
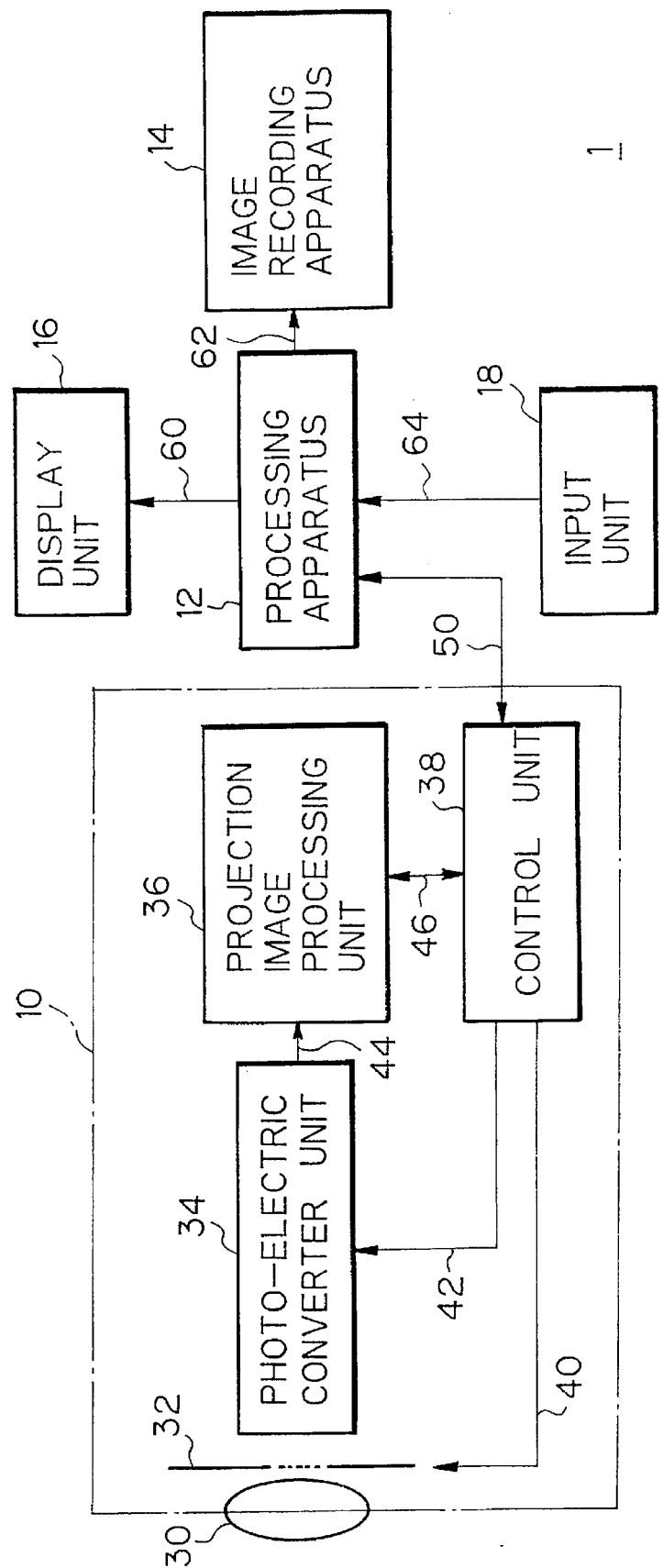
FIG. 1 is a schematic diagram showing a functional structure of a camera system according to a preferred embodiment of the present invention.

Referring to FIG. 1, a camera system 1 is concerned with providing such a function that a pixel signal, which is derived through photographing of an object by a camera 10, is processed to make up a projection image signal. The formed projection image signal is further processed by a processing apparatus 12 to form image data. The issued image data is recorded on an information recording medium which is mounted on an image recording apparatus 14. The camera system 1 also provides performing prior to an image shooting, a pre-shooting for beforehand photographing an image of an object so that a suitable exposure can be obtained in compliance with the object and photographic conditions. Then light metering conditions, such as a desired photometric method, and a metering position are set up on the basis of image data representing the pre-shot image formed by the pre-shooting. The image shooting is performed on the basis of the exposure calculated through the light metering under the set up light metering conditions. Incidentally, in the following explanation, the portions which are deemed to be not essential for the present invention will be omitted in the illustration and the description. Reference numerals for signals are each denoted by that for connecting wire or line on which the signal appears.

Specifically, to describe the camera system 1 more in details, the camera system 1 comprises a camera 10 for photographing an object to form image data representative of an image of the object, a processing apparatus 12 for setting up light metering conditions according to the operational state on the basis of an image data representing a pre-shot image made up by the camera 10 to control the camera 10 on the basis of the set up information, an image recording apparatus 14 for recording image data output from the processing apparatus 12 on an information recording medium, a display unit 16 for displaying an image represented by the image data output from the processing apparatus 12, and an input unit 18 for detecting the operating condition of the operator to inform the processing apparatus 12 of operational information representing the detected operating condition.

The camera 10 is a still-picture camera for photographing an object to form image data representative of an image of the object. The camera 10 comprises a shooting lens system 30 for forming an optical image of an object, a stop 32 for adjusting a quantity of light incident via the shooting lens system 30, a photo-electric converter unit 34 for generating a pixel signal corresponding to the optical image formed on the image-forming plane upon incidence via the shooting lens system 30 and the stop 32, a projection image processing unit 36 for processing the pixel signal generated from the photo-electric converter unit 34 to form image data representing the pixel signal, and a control unit 38 for controlling operations of the stop 32 and the photo-electric converter unit 34 under control of the processing apparatus 12.

The stop 32 of the camera 10 serves as an aperture controlled to open and close in accordance with a drive signal 40 supplied from the control unit 38 so that a light quantity of luminous flux passing through the stop 32 is adjusted. The stop 32 adjusts the aperture in accordance with the stop value represented by the drive signal 40.

The photo-electric converter unit 34 comprises an image pickup circuit provided with an image pickup device (not illustrated) for intercepting an optical image of an object to produce a pixel signal representing the optical image. The photo-electric converter unit 34 receives a drive signal 42 supplied from the control unit 38, drives the image pickup device at a shutter speed according to the drive signal 42, reads out the pixel signal produced by the image pickup device, and outputs the pixel signal representative of the image of the object to an output 44. The photo-electric converter unit 34 is constituted of, for example, a three-plate optical system having three units of solid-state image pick-up devices corresponding to three primary colors. These solid-state image pick-up devices may generate pixel signals to reproduce an image quality having about nine hundred thousand pieces of effective pixels and corresponding to a HDTV (High Definition TV). The output 44 of the photo-electric converter unit 34 is connected to the projection image processing unit 36.

The projection image processing unit 36 comprises a process circuit for practicing a predetermined signal treatment for the pixel signals generated from the photo-electric converter unit 34 and for amplifying the pixel signals to a desired level. The projection image processing unit 36 produces a projection image signal, for example, in such a manner that the pixel signal outputted from the photo-electric converter unit 34 is subjected to the color correction and outline correction treatments, and the thus obtained pixel signal is subjected to a γ-correction treatment for correction of a γ-value of the pixel signal and in addition subjected to a projection image signal processing such as addition of a blanking signal and a white clipping. Further, the projection image processing unit 36 converts the produced projection image signal into a digital signal and outputs the image data in the form of digital value to an output 46. The output 46 of the projection image processing unit 36 is connected to the control unit 38.

The control unit 38 comprises a control circuit for controlling the camera 10 on the basis of an instruction signal from the processing apparatus 12. The control unit 38 controls the stop 32 and the photo-electric converter unit 34 on the basis of information and the instruction signal transmitted from the processing apparatus 12 through an input 50. Specifically, the control unit 38 is provided with a frame memory (not illustrated) for temporarily storing image data and causes the frame memory to store the image data transmitted from the projection image processing unit 36 via the line 46. The control unit 38 is responsive to the instruction signal 50 to practice a reduction processing in which a size of an image represented by the image data stored in the frame memory is reduced to one-eighth, and produces an image data representative of a pre-shot image for display on the display unit 16 which is connected to the processing apparatus 12. The produced image data representative of a pre-shot image is output to the output 50 which is connected through, for example, a SCSI bus 50 which is adapted to a Small Computer System Interface (SCSI) standard, to the processing apparatus 12. The control unit 38 serves as a drive control function such that an exposure control in the camera 10 is performed to drive the camera 10. More in details, the control unit 38 recognizes a stop value in the stop 32 and the shutter speed in the photo-electric converter unit 34 in accordance with the instruction signal 50, and performs a drive control for the stop 32 and the photo-electric converter unit 34 on the basis of the recognized information.

The processing apparatus 12 controls the camera 10 in accordance with the operational condition by an operator and comprises a computer system constituted of a personal computer. The processing apparatus 12 provides such a control that an image representing an operating frame useful for controlling the camera 10 is displayed on a display screen of the display unit 16 while a pre-shooting and an image shooting are conducted. A pre-shot image formed through the pre-shooting is displayed in a preview picture area which is set up within the operating frame. The processing apparatus 12 performs a processing for determining a stop value and a shutter speed for an image shooting on the basis of the image data representative of the pre-shot image. In the processing apparatus 12, the above mentioned control is effected in accordance with the operational information entered by an operator on the basis of the operating frame displayed on the display unit 16. More in detail, connected to an input 64 of the processing apparatus 12 is the input unit 18, such as a keyboard and a mouse, for detecting the operating state by an operator. Thus, the processing apparatus 12 controls the camera 10 on the basis of the operational information detected by the input unit 18 to perform a pre-shooting for determining an exposure value for an image shooting. Further, the processing apparatus 12 measures a brightness on a target area of the pre-shot image formed through the pre-shooting in accordance with the operational information detected by the input unit 18, and then controls the camera 10 on the basis of information detected through the light metering to perform an image shooting. When the take shot is performed, the processing apparatus 12 practices a predetermined processing for recording image data formed by the camera 10 on an information recording medium and then outputs to an output 62. An output 60 of the processing apparatus 12 is connected to the display unit 16 on the display screen of which an image represented by the image data is displayed, while the output 62 of the processing apparatus 12 is connected to the image recording apparatus 14 for recording image data representative of an image photographed by the camera 10.

Figure 3:
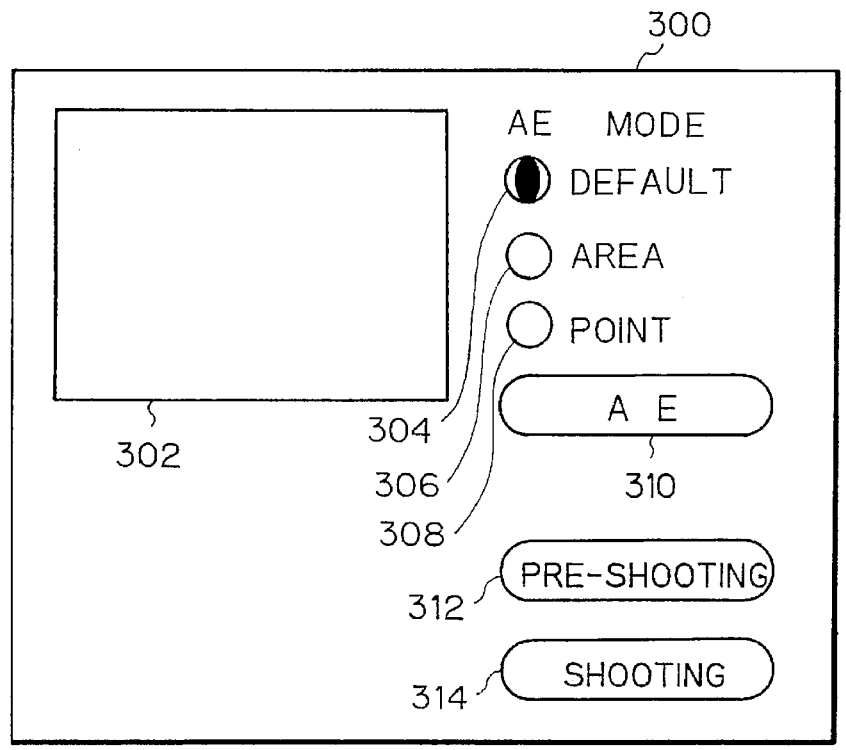
FIGS. 3–8 are views each showing an example of an operating frame useful for understanding the embodiment of the present invention.

The processing apparatus 12 produces image data to display on the screen of the display unit 16, for example, an operating frame 300 as shown in FIG. 3. Specifically, the operating frame 300 is provided with a preview picture area 302, at the left hand side, which is available for displaying the pre-shot image representing the reduced image of the image photographed by the camera 10. Above at the right hand side of the operating frame 300, there are disposed a default button 304, an area button 306 and a point button 308, which are each an exposure metering button for selecting an exposure metering mode (AE mode). Below these exposure metering buttons there is disposed an AE button 310 for starting the light metering in accordance with the exposure metering mode selected by the exposure metering button. Down at the right hand side of the operating frame 300, there are disposed a pre-shooting button 312 for beforehand performing an image pickup of an image of an object in order to determine a light metering area, and a shooting button 314 for performing a take shot on the basis of an exposure value calculated through the light metering.

Now referring to FIG. 2, the processing apparatus 12 and the control unit 38 in the camera 10 will be described more in detail hereinafter.

Figure 2:
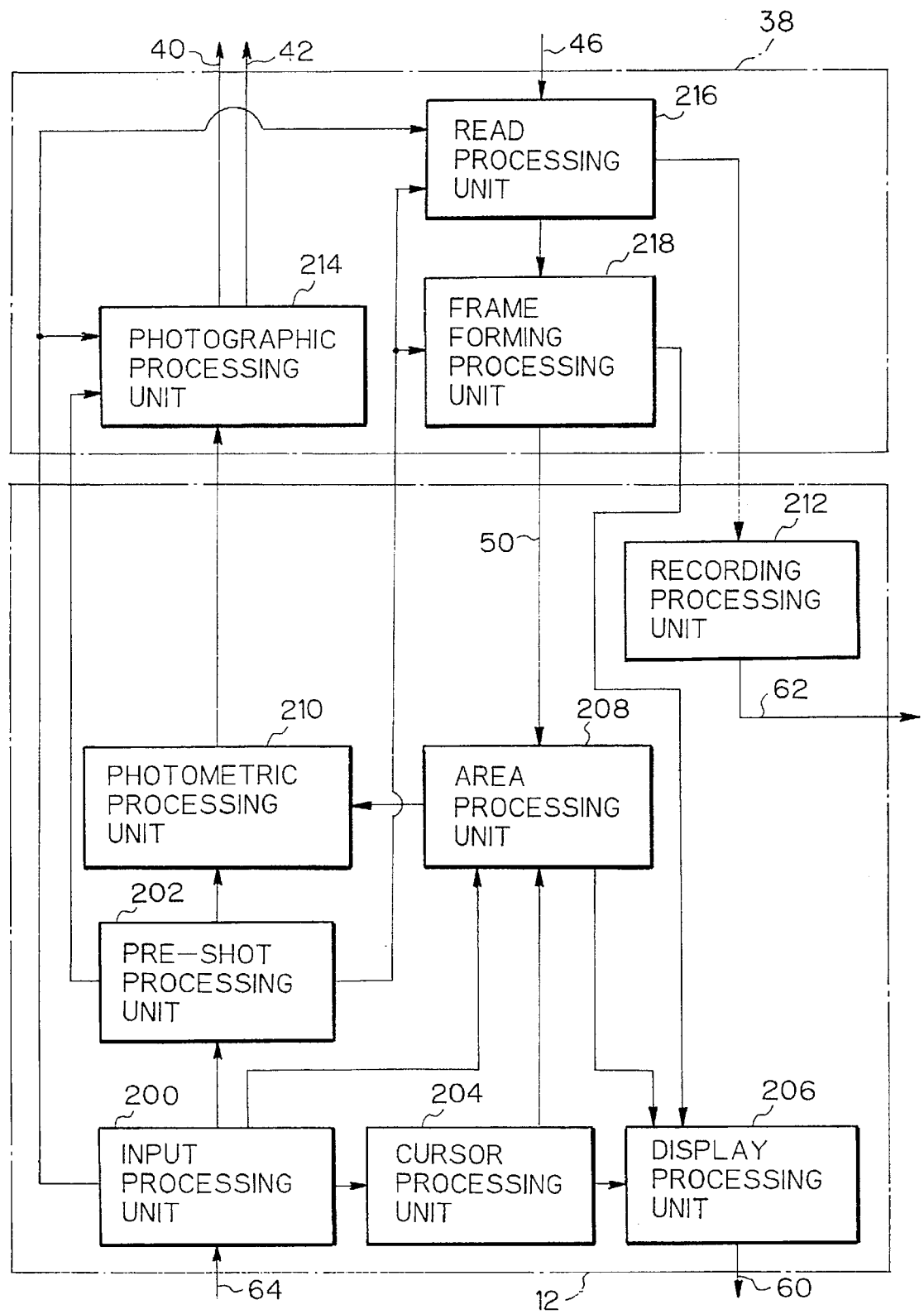
FIG. 2 is a block diagram showing a functional structure of a control unit and a processing apparatus included in the camera system shown in FIG. 1.

In FIG. 2, there is shown a functional structure of the processing apparatus 12 and the control unit 38. The processing apparatus 12 comprises an input processing unit 200, a pre-shot processing unit 202, a cursor processing unit 204, a display processing unit 206, an area processing unit 208, a photometric processing unit 210, and a recording processing unit 212. The control unit 38 comprises a photographic processing unit 214, a read processing unit 216 and a frame forming processing unit 218.

The input processing unit 200 recognizes operational information representing the operating state by an operator, which is obtained from the input unit 18 through the connection line 64, and informs the associated function units of the recognized information. More specifically, the input processing unit 200 recognizes operational information representing the selected states of the respective buttons which have been indicated on the operating frame 300, and further operational information representing an indication of co-ordinates within the operating frame 300, corresponding to the operating frame 300 formed in the display processing unit 206 which will be described later, and informs of the recognized operational information by messages to the pre-shot processing unit 202, the cursor processing unit 204, the area processing unit 208, the photographic processing unit 214, and the read processing unit 216.

The pre-shot processing unit 202 performs a setting for forming a pre-shot image through the image pickup by the camera 10 based on the operational information transmitted from the input processing unit 200. Upon receipt of the operational information representative of the fact that the pre-shooting button 312 is selected, the pre-shot processing unit 202 sets up initial information for an automatic exposure for photographing the pre-shot image, and informs the photographic processing unit 214 and the read processing unit 216 of the setting initial information. Further, the pre-shot processing unit 202 informs the read processing unit 216 of a read instruction signal to read image data obtained through the camera 10, and in addition informs the frame forming processing unit 218 of a forming instruction signal to form the pre-shot image.

The cursor processing unit 204 issues cursor information representative of a cursor for designating a target position on the operating frame 300 on the basis of the operational information transmitted from the input processing unit 200. Specifically, the cursor processing unit 204 issues the cursor information including position information representative of a position of the cursor on the operating frame 300 in accordance with the operational information detected in the input processing unit 200. The cursor processing unit 204 informs of the issued cursor information the display processing unit 206 and the area processing unit 208.

The display processing unit 206 provides such a processing that image data representative of the operating frame 300 as shown in FIG. 3 is produced and displayed on the display unit 16, and in addition a pre-shot image, which is represented by image data produced in the frame forming processing unit 218 which will be described latter, is displayed in the preview picture area 302 on the operating frame 300.

The display processing unit 206 causes an image of the cursor represented by cursor information sent out from the cursor processing unit 204 to be displayed the operating frame 300 on the basis of the cursor information. Further, the display processing unit 206 provides such a processing that image data, which causes an image representative of area information indicating a photometric zone set up in the area processing unit 208 to be displayed on the display unit 16, is issued on the basis of the area information, and an image represented by the issued image data is displayed in the preview picture area 302.

Figure 5:
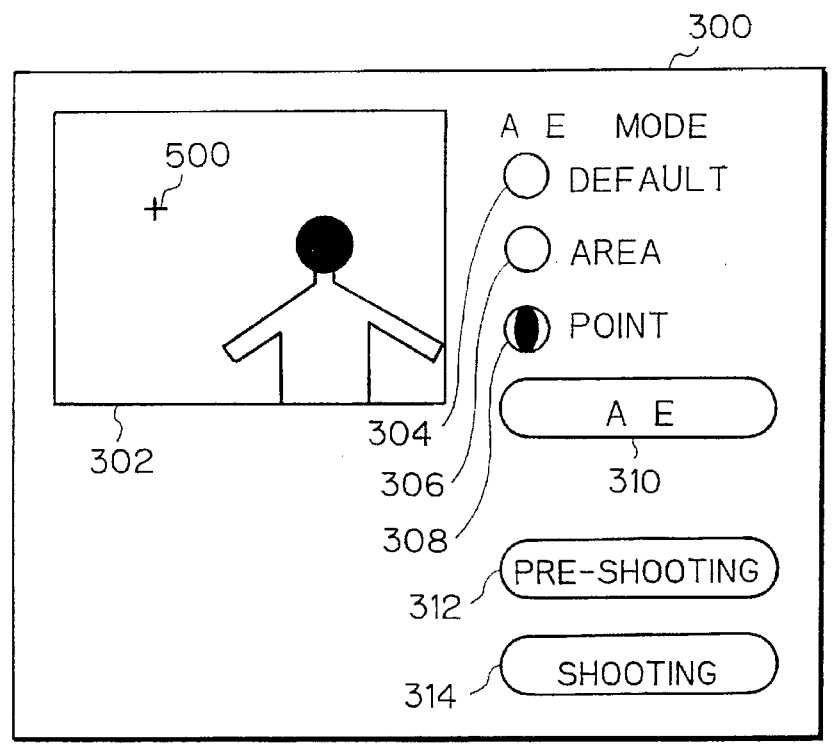

The area processing unit 208 sets up a photometric zone involved in a pre-shot image formed in the frame forming processing unit 218 which will be described later. Specifically, the area processing unit 208 produces area information representing a photometric zone involved in a pre-shot image on the basis of the operational information detected by the input processing unit 200 and the cursor position information provided by the cursor processing unit 204. For example, when the operational information detected by the input processing unit 200 indicates that the point button 308 is selected, the area processing unit 208 produces the area information which causes a cross shaped area indication 500, as shown in FIG. 5, representing an area to be measured by a point metering to be displayed in the the preview picture area 302. In this case, the area processing unit 208 produces the area information designating a predetermined area expanding with a crossing point of the cross shaped mark of the area indication 500 in the center.

Figure 7:
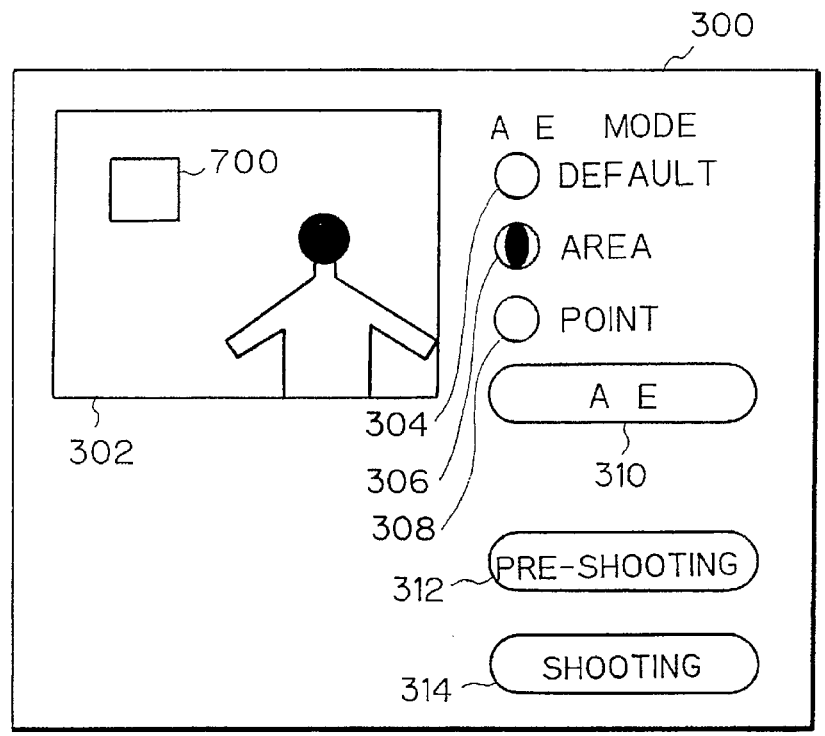

When the area button 306 is selected, the area processing unit 208 produces the area information which causes a quadrangle of area indication 700, as shown in FIG. 7, representing an area to be measured by an area metering to be displayed in the the preview picture area 302. In this case, the area processing unit 208 produces the area information designating a range within a frame of the area indication 700. With respect to individual pieces of the area information representative of the area indication 500 and the area indication 700, respectively, it is acceptable that a plurality of pieces of area information are produced in compliance with an object. In this case, it is also acceptable that the area processing unit 208 practices weighting for the individual pieces of area information in accordance with the operational information recognized by the input processing unit 200. The area processing unit 208 sets up a size of the area indication 700 to be formed in accordance with the operational information recognized by the input processing unit 200. Further, the area processing unit 208 informs the display processing unit 206 of the produced area information, and in addition transmits the image data corresponding to the produced area information to the photometric processing unit 210.

The photometric processing unit 210 measures a brightness of an object on the basis of the image data representative of the pre-shot image corresponding to the area information produced in the area processing unit 208. Specifically, the photometric processing unit 210 measures a luminance level of the image data corresponding to the area information transferred from the area processing unit 208 on the basis of the same image data to issue photometric information representing the luminance level. Further, the photometric processing unit 210 determines an exposure value in the camera 10 in accordance with the photometric information obtained through a light metering. The photometric processing unit 210 determines a stop value and a shutter speed in accordance with the exposure value, and transmits exposure information representative of the stop value and the shutter speed to the photographic processing unit 214 of the control unit 38.

The recording processing unit 212 converts image data representative of the shot image read out from a frame memory of the control unit 38 by the read processing unit 216 into a predetermined format adapted for recording on an information recording medium. For example, the recording processing unit 212 practices a compression processing based on a predetermined length of compression format for the image data read out from the read processing unit 216 so as to produce storage recording data reduced in data length, and outputs the thus produced recording data to the image recording apparatus 14 connected to the output 62.

The photographic processing unit 214 controls overall the camera 10 on the basis of information transmitted from the processing apparatus 12. Upon receipt of initial information from the pre-shot processing unit 202, the photographic processing unit 214 performs the photographic control to form a pre-shot image. Specifically, the photographic processing unit 214 determines a stop value and a shutter speed in accordance with the initial information, drives the stop 32 to attain the determined stop value, and drives the photoelectric converter unit 34 to attain the determined shutter speed. The photographic processing unit 214 drives the photo-electric converter unit 34 to photograph an image of an object, and generates an image signal representative of the image of the object. Further, the photographic processing unit 214 controls the stop 32 and the photo-electric converter unit 34 in accordance with the exposure information calculated in the photometric processing unit 210 through the pre-shooting and the operational information transmitted from the input processing unit 200. For example, when the shooting button 314 is selected on the operating frame 300, the photographic processing unit 214 drives the stop 32 and the photo-electric converter unit 34 in accordance with the received exposure information.

The read processing unit 216 reads out image data stored in the frame memory of the control unit 38. Specifically, the read processing unit 216 reads out image data stored in the frame memory, which data is involved in the pre-shot image, on the basis of a read instruction signal transmitted from the pre-shot processing unit 202, and transfers the thus read out image data to the frame forming processing unit 218. When the input processing unit 200 identifies operational information indicating that the shooting button 314 is selected, the read processing unit 216 reads out image data stored in the frame memory, and transfers the thus read out image data to the recording processing unit 212.

Figure 4:
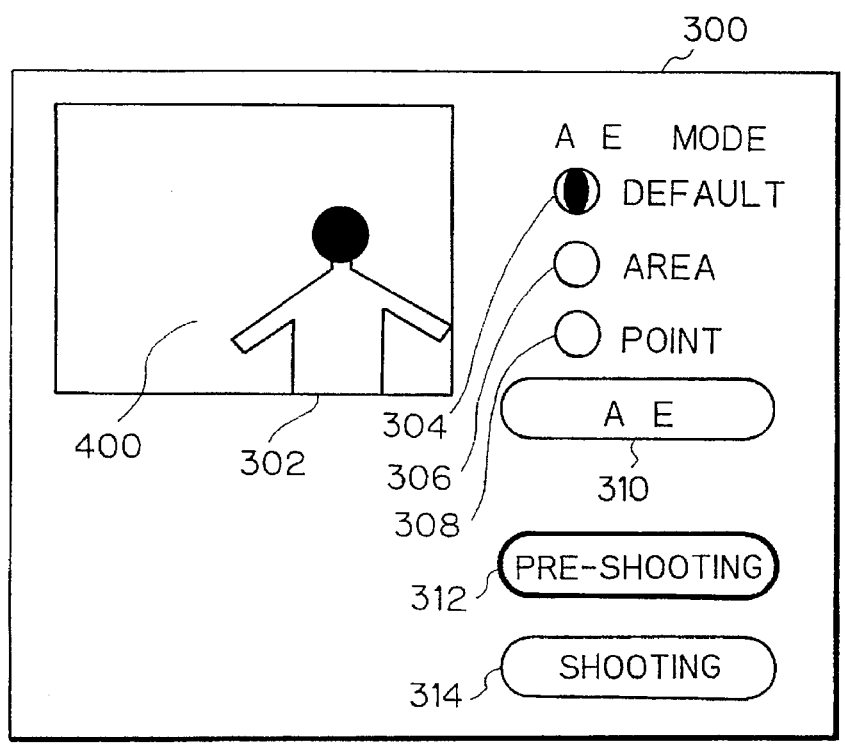

The frame forming processing unit 218 processes image data transmitted from the read processing unit 216 to reduce a size of an image represented by the image data. Upon receipt of a forming instruction signal from the pre-shot processing unit 202, the frame forming processing unit 218 performs a thinning treatment for the image data transmitted from the read processing unit 216, for example, with respect to the horizontal direction and the vertical direction of the image, so that a size of an image represented by the image data is reduced. The frame forming processing unit 218 produces image data representing a pre-shot image which is reduced to a scale of one-64th of the size of the image represented by the image data, that is, one-eighth in length and width, respectively. The frame forming processing unit 218 produces image data representative of a pre-shot image 400, for example, as shown in FIG. 4, which is displayed in the preview picture area 302 upon reduction of the image represented by the image data, and transmits the thus produced image data to the display processing unit 206 and the area processing unit 208.

Again, referring to FIG. 1, the display unit 16 displays an image represented by the projection image signal output from the processing apparatus 12. For example, the display unit 16 serves as a monitor for displaying an image represented by a projection image signal corresponding to an NTSC standard.

The image recording apparatus 14 records image data, which is formed through the image pick-up by the camera 10 and the processing by the processing apparatus 12, on an information recording medium. As the image recording apparatus 14, for example, an optical disk apparatus is applicable in which image data are recorded on an information recording medium such as an optical disc available for recording data.

Figure 9:
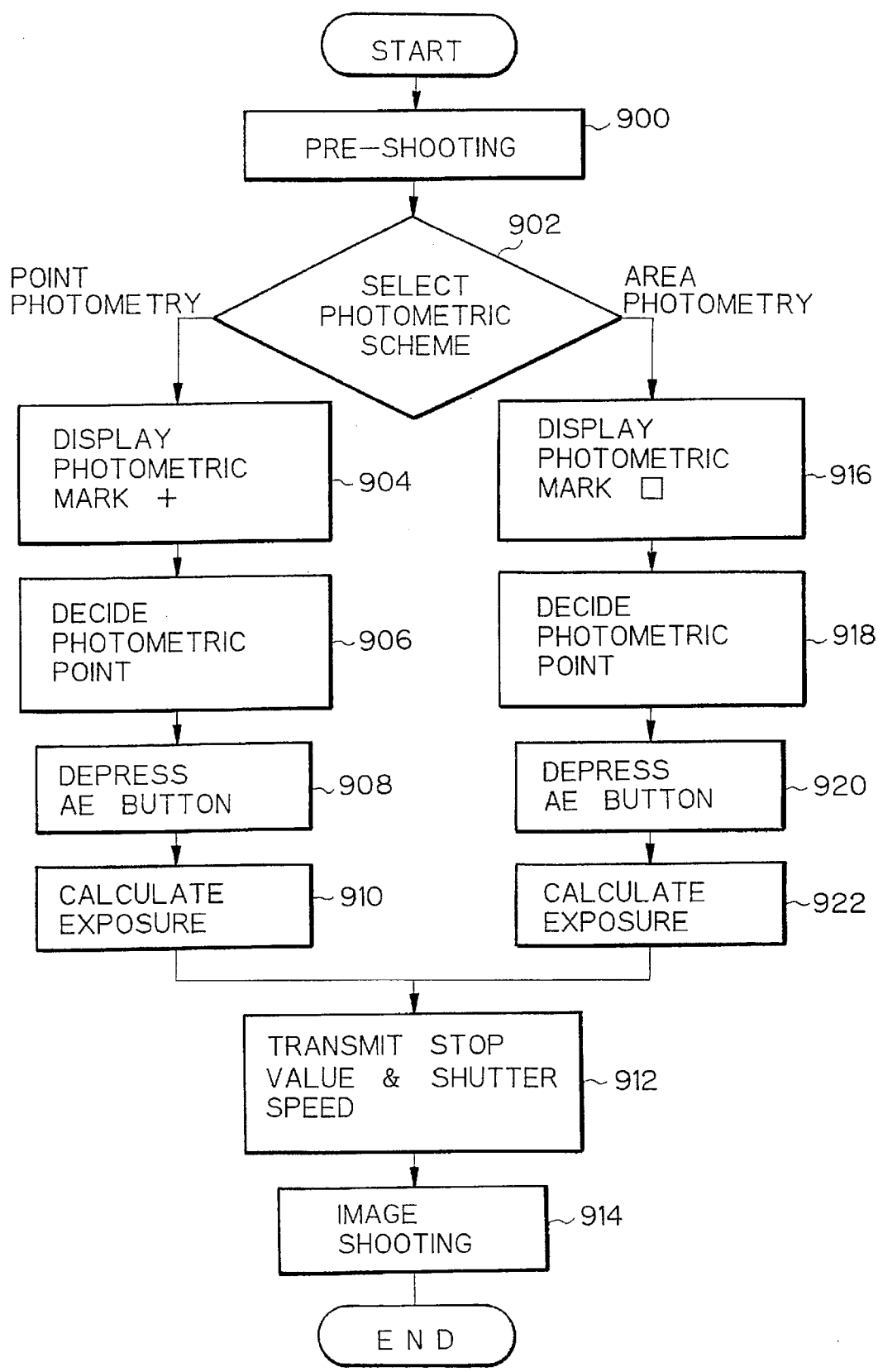
FIG. 9 is a flowchart useful for understanding the operation of the camera system according to the embodiment of the present invention.

Next, an operation of the camera system 1 will be described referring to FIG. 9 showing an operational flow-chart for the camera system 1. First, in a state that the camera 10 of the camera system 1 is set up toward the an object. A luminous flux is incident through the shooting lens 30 and the stop 32 is formed on the image-forming plane of the photo-electric converter unit 34. Image data, data representative of the operating frame 300 shown in FIG. 3 which is produced in the display processing unit 206 of the processing apparatus 12, is output to the output 60. The outputted image data is sent out to the display unit 16, so that the operating frame 300 is displayed on a display screen thereof.

Referring to FIG. 9, in step 900, when the pre-shooting button 312 is selected in the operating frame 300 through an operation of the input apparatus 18, the input processing unit 200 detects the operational state, and transmits operational information representative of the operational state to the pre-shot processing unit 202. The pre-shot processing unit 202 transmits to the photographic processing unit 214 initial information for image pickup of a pre-shot image. The operational information is also transmitted to the cursor processing unit 204 to form cursor information. The formed cursor information is transmitted to the display processing unit 206, so that a cursor is displayed on the pre-shooting button 312. Incidentally, in FIGS. 3 to 8, the cursor is omitted in illustration.

Upon receipt of the initial information, the photographic processing unit 214 outputs a drive signal 40 for driving the stop 32 and a drive signal 42 for driving the photo-electric converter unit 34 in accordance with the initial information. The stop 32 and the photo-electric converter unit 34 are operative in accordance with the drive signals 40 and 42, respectively. The photo-electric converter unit 34 generates a pixel signal 44 representative of an image of an object, and transmits the pixel signal 44 to the projection image processing unit 36. In the projection image processing unit 36, the received pixel signal 44 is amplified, subjected to a correction processing, and converted into the image data in form of the digital value. This image data is transferred via a line 46 to the control unit 38. In the control unit 38, the image data is stored in a frame memory (not illustrated). The stored image data is read out with the read processing unit 216. The frame forming processing unit 218 performs a reduction processing for the read out image data in which a size of the image is reduced, and produces image data representative of a pre-shot image. The thus produced image data is transferred via a connection line 50 to the display processing unit 206 and the area processing unit 208. The image data representative of the pre-shot image, which has been transferred to the display processing unit 206, is compounded within the preview picture area 302 disposed in the operating frame 300. The compounded image data is output via a line 60 to the display unit 16 in which as shown in FIG. 4, a pre-shot image represented by the image data is displayed in the preview picture area 302.

Next, the process goes to step 902 in which the operational state of the input apparatus 18 is detected. In step 902 if, as shown in FIG. 5, the point button 308 displayed in the operating frame 300 is selected, the program proceeds to step 904, while as shown in FIG. 7, if the area button 306 is selected, the program proceeds to step 916.

In step 904 wherein the point button 308 is selected, the operational information detected in the input processing unit 200 is transmitted to the cursor processing unit 204 in which cursor information is produced on the basis of the operational information. The produced cursor information is transferred to the display processing unit 206, so that the selected point button 308 is displayed as shown in FIG. 5. When operational information detected in the input unit 200 is processing transmitted to the area processing unit 208, area information is produced in accordance with the operational information. The thus produced area information is transferred to the display processing unit 206. As a result, there is produced image data representative of an area indication 500 designating an area to conduct a point photometry as to a predetermined zone in the preview picture area 302, so that the area indication 500 is displayed at the predetermined position in the preview picture area 302 which is displayed on a display screen of the display unit 16.

In step 906, the input apparatus 18 is operated, operational information representative of the operational state of the input apparatus 18 is transmitted to the cursor processing unit 204, cursor information identified in the cursor processing unit 204 is transferred to the display processing unit 206, and the area indication 500 displayed in the preview picture area 302 is moved to a target position. Further, the cursor information including position information of the area indication 500 is transferred to the area processing unit 208 which identifies an area on which the point photometry is to be carried out.

Figure 6:
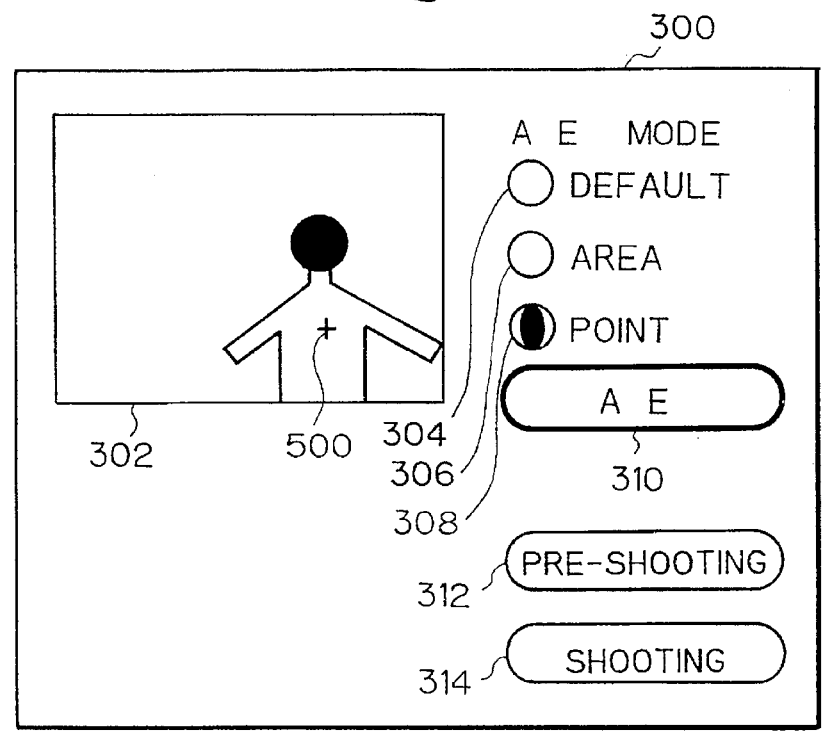

Next, the process goes to step 908 in which when the AE button 310 in the operating frame 300 is selected, as shown in FIG. 6, the area processing unit 208 produces, upon receipt of the operational information from the input processing unit 200, area information corresponding to cursor information transmitted from the cursor processing unit 204 in accordance with the same cursor information, and then transfers to the photometric processing unit 210 the image data transmitted from the frame forming processing unit 218, which image data corresponds to the produced area information in the area processing unit 208.

In step 910, when the image data corresponding to the area information is transmitted to the photometric processing unit 210, the photometric processing unit 210 calculates an exposure value corresponding to the brightness of the received image data, and determines exposure information representing the stop value and the shutter speed corresponding to the calculated exposure value.

Next, the process goes to step 912 in which the exposure information determined in step 910 is transferred from the photometric processing unit 210 to the photographic processing unit 214. When the exposure information is transferred to the photographic processing unit 214, the camera 10 is in a ready state for controlling the stop 32 and the photo-electric converter unit 34, waiting reception of the operational information representative of the state in which the shooting button 314 is selected from the input processing unit 200.

In step 914, when the shooting button 314 is selected and the photographic processing unit 214 receives the operational information representative of the fact that the shot button 314 is selected, the stop 32 and the photo-electric converter unit 34 are driven on the basis of the exposure information which has been transferred to the photographic processing unit 214, so that the photo-electric converter unit 34 produces a pixel signal representative of an image of an object through a photo-electric conversion. The produced pixel signal is transmitted via the line 44 to the projection image processing unit 36. The projection image processing unit 36 practices a predetermined processing for the pixel signal, such as an amplification processing and a correction processing, and the processed pixel signal is converted into image data defined in a digital value. The image data in form of the digital basis is transmitted via the connection line 46 to the control unit 38. The image data transmitted to the control unit 38 is stored in the frame memory (not illustrated). The image data stored in the frame memory is read out under control of the read processing unit 216 of the control unit 38, and transferred via the connection line 50 to the recording processing unit 212 of the processing apparatus 12. The image data transferred to the recording processing unit 212 is subjected to the compression processing to form a storage recording data. The formed recording data is transmitted via the line 62 to the image recording apparatus 14. In the image recording apparatus 14, the recording data is recorded on the information recording medium mounted on the image recording apparatus 14.

In step 902, if the area button 306 disposed on the operating frame 300 is selected, the program proceeds to step 916 in which the area button 306 selected on the basis of the operational information detected in the input processing unit 200 is displayed as shown in FIG. 7. Upon receipt of the operational information, the area processing unit 208 issues area information according to the operational information, and transmits the area information to the display processing unit 206. Upon receipt of the area information, the display processing unit 206 produces image data representative of an area indication 700 designating an area to conduct an area photometry as to a predetermined zone in the preview picture area 302, as shown in FIG. 7, so that the area indication 700 is displayed at the predetermined position in the preview picture area 302 which is displayed on a display screen of the display unit 16.

Figure 8:
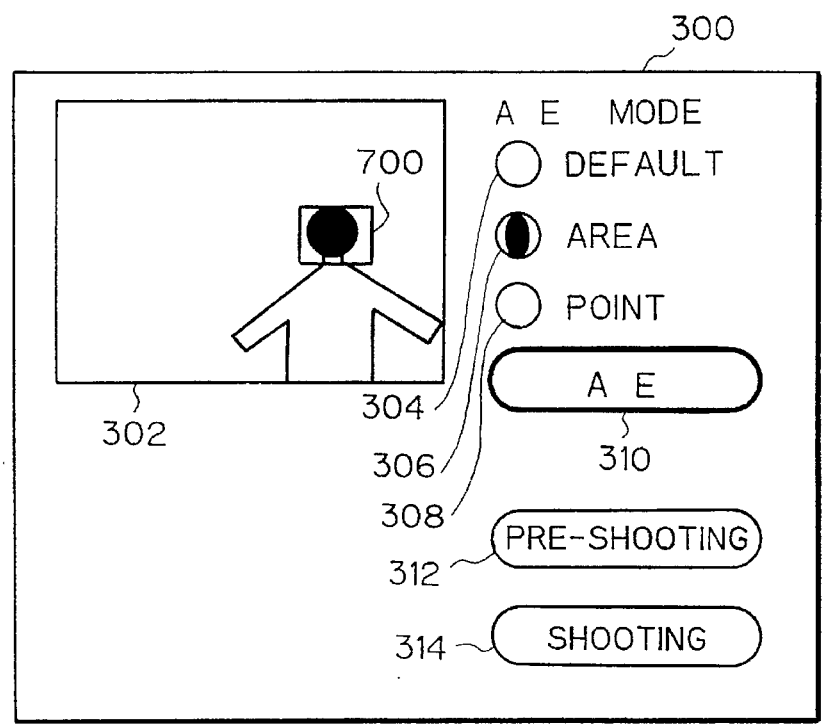

Next, the process goes to step 918 in which when the input apparatus is operated to move the area indication 700 compounded on a pre-shot image zone 302 displayed in the preview picture area 302 to a target metering position, operational information representative of the operational state is transmitted to the cursor processing unit 204. Upon receipt of the operational information, the cursor processing unit 204 detects cursor information according to the operational information and transmits the detected cursor information to the display processing unit 206. Upon receipt of the cursor information, the display processing unit 206 causes the area indication 700 to be displayed at a position of the pre-shot image zone 302 according to the cursor information. In this manner, for example, as shown in FIG. 8, the area indication 700 is travelled to a target position in the image of the object.

In step 920, when the AE button 310 disposed on the operating frame 300 is selected, the area processing unit 208 issues area information associated with the cursor information issued in the cursor processing unit 204 in accordance with the same cursor information. When the area processing unit 208 issues the area information, the image data associated with the area information, which is transmitted from the frame forming processing unit 218, is transferred to the photometric processing unit 210.

Next, the program proceeds to step 922 in which when image data associated with the area information is transferred to the photometric processing unit 210, the photometric processing unit 210 calculates an exposure value associated with a brightness of the received image data, and determines exposure information representative of the stop value and the shutter speed corresponding to the calculated exposure value. When the exposure information is determined, the steps 912 and 914 are sequentially executed, so that an image of an object at the time of shooting is photographed and the image recording apparatus 14 records the image data representative of the formed image on an information recording medium.

As described above, according to the camera system 1, prior to the image shooting, the pre-shooting is carried out for a light metering. The image data representative of an image of an object, which has been derived through the pre-shooting, is processed by the control unit 38 in the camera 10 to form image data representative of a pre-shot image. The formed image data is transferred to the processing apparatus 12, and the pre-shot image is displayed in the preview picture area 302 of the display unit 16. An operator selects and designates on a screen a photometric mode and a photometric zone on the basis of the pre-shot image displayed in the preview picture area 302, in order to determine an exposure for an image shooting. Thus, it is possible to select a photometric mode according to the image of the object which is obtained through the pre-shooting, and in addition possible to designate a photometric zone at the target position of the image of the object. Consequently, for example, even in a photographic condition of the object under which it is difficult to form an adequate image with a usual photometric method, according to the present embodiment, it is possible to photograph an image according to the photographic purpose, since the camera 10 is controlled with adequate stop value and shutter speed on the basis of a photometric result of metering of the target zone.

Further, according to the present embodiment, it is possible to readily perform the light metering at a plurality of positions in the pre-shot image displayed in the preview picture area 302, and in addition possible to readily confirm the designated photometric area with the area indication 500 and the area indication 700. Furthermore, according to the present embodiment, it is possible to apply weighting to photometric values involved in a plurality of positions of the pre-shot image displayed in the preview picture area 302.

Still furthermore, according to the present embodiment, a storage of a plurality of set up photometric conditions such as a photometric scheme and a photometric zone makes it possible to readily implement light metering in a photometric condition set up once in compliance with the camera subject.

Next, another embodiment of the present invention involved in an automatic focusing will be explained in conjunction with the accompanying drawings.

Figure 10:
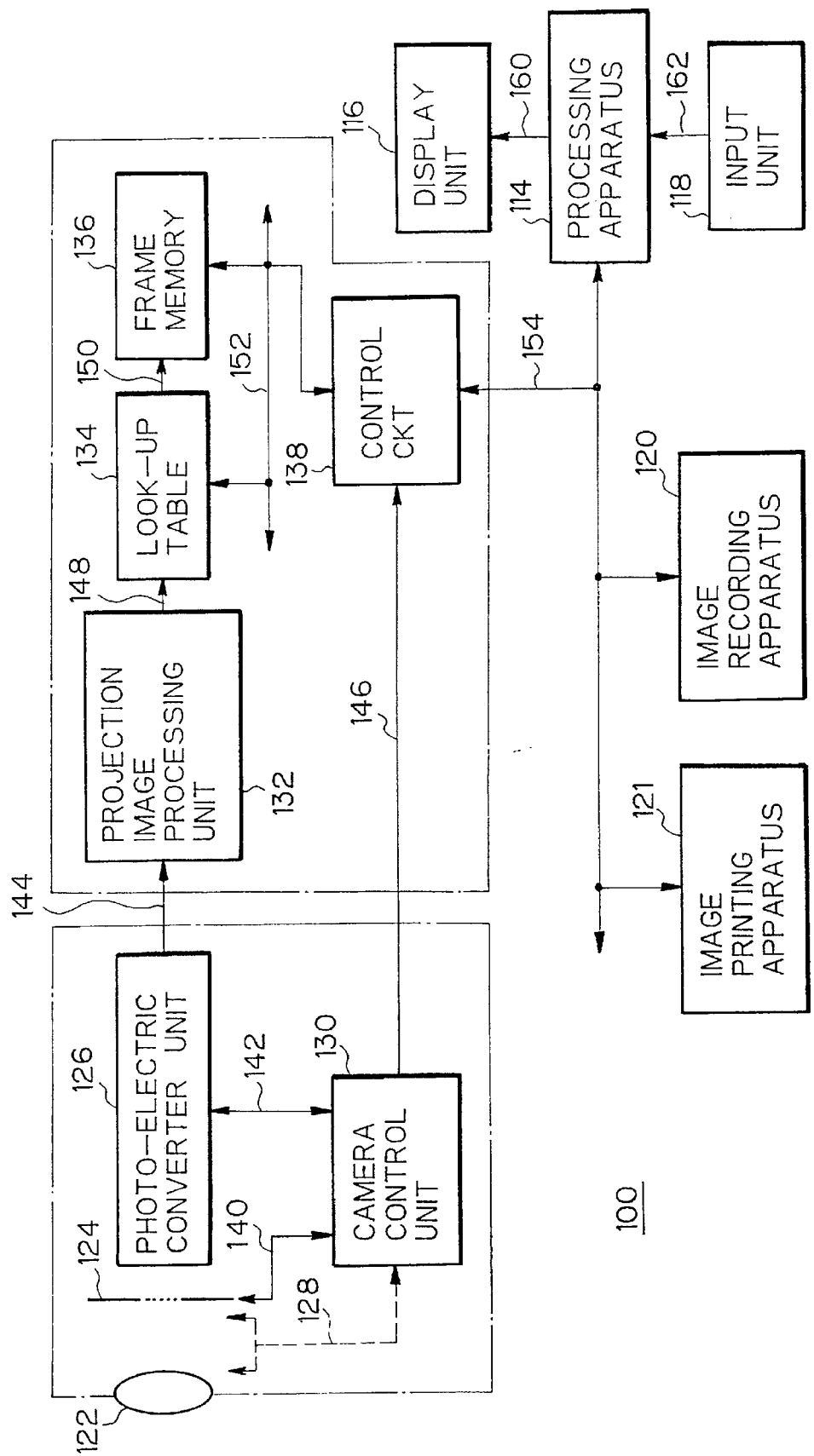
FIG. 10 is a schematic diagram showing a functional structure of a camera system according to another embodiment of the present invention.

Referring to FIG. 10, a camera system 100 is concerned with providing such a function that a pixel signal, which is derived through photographing of an object by a camera 110, is processed by a control unit 112 to make up image data corresponding to the pixel. The image data formed in the control unit 112 is further processed by a processing apparatus 114, and the formed image data is output to a image recording apparatus 120 connected to the processing apparatus 114 so as to be recorded on an information recording medium. The camera system 100 is also concerned with providing such a function that prior to an image shooting, a pre-shooting for beforehand photographing an image of an object and a pre-focusing for determining a distance to a camera subject are performed so that a suitable focal point can be obtained in compliance with the object and photographic conditions. The focusing conditions such as a desired focusing frame and a position of the focusing frame are set up on the basis of image data representing the pre-shooting image formed by the pre-shooting. The take shot is performed, upon determining a lens position in the image shooting, on the basis of position information of the lens obtained through the pre-focusing under the set up focusing conditions. Incidentally, in the following explanation, the portions which are deemed to be not essential for the present invention will be omitted in the illustration and the description. The reference numerals for signals are each denoted by that for connecting wire or line on which the signal appears.

Specifically, to describe the camera system 100 more in detail, the camera system 100 comprises a camera 110 for photographing an object to form a pixel signal representative of an image of the object, a control unit 112 for producing image data corresponding to the pixel signal formed in the camera 110 from the same pixel signal and image data representative of a pre-shot image which is formed through a reduction of the image represented by the former image data, a processing apparatus 114 for setting up focusing conditions according to the operational state on the basis of the image data representing the pre-shot image to control the camera 110 on the basis of the set up information through the control unit 112, a display unit 116 for displaying an image represented by the image data outputted from the processing apparatus 114, an input unit 118 for detecting the operating condition by an operator to inform the processing apparatus 114 of operational information representing the detected operating condition, an image recording apparatus 120 for recording image data output from the processing apparatus 114 on an information recording medium, and an image printing apparatus 121 for forming an image represented by the image data outputted from the processing apparatus 114 on a recording medium.

The camera 110 is a still-picture pickup device for photographing an object to form a pixel signal representative of an image of the object. The camera 110 comprises a shooting lens system 122 for forming an optical image of an object, a stop 124 for adjusting a quantity of light incident via the shooting lens system 122, a photo-electric converter unit 126 for generating a pixel signal corresponding to the optical image formed on the image-forming plane upon incidence via the shooting lens system 122 and the stop 124, a driving mechanism 128 for moving the position of the shooting lens system 122, and a camera control unit 130 for driving the stop 124, the photo-electric converter unit 126 and the driving mechanism 128 under control of the control unit 112. The control unit 112 comprises a projection image processing unit 132 for processing the pixel signal generated in the camera 110 to form image data representing the pixel signal, a look-up table 134 for performing a γ-correction processing for the image data formed in the projection image processing unit 132, a frame memory 136 for storing the image data subjected to the γ-correction processing in the look-up table 134, and a control circuit 138 for controlling overall the camera 110 and the control unit 112, upon receipt of an instruction from the processing apparatus 114, and for producing image data representative of a pre-shot image for an automatic focusing.

The stop 124 of the camera 110 serves as a mechanism that controls an aperture to open and close in accordance with a drive signal 140 supplied from the control unit 130 so that a light quantity of luminous flux passing through the stop 124 is adjusted. The stop 124 adjusts the aperture in accordance with the stop value represented by the drive signal 140. The stop 124 defines a depth of field in the shooting lens system 122 in accordance with the size (stop value) of the aperture.

The photo-electric converter unit 126 comprises an image pickup circuit provided with an image pickup device (not illustrated) for intercepting an optical image of an object to produce a pixel signal representing the optical image. The photo-electric converter unit 126 receives a drive signal 142 supplied from the camera control unit 130, drives the image pickup device at a shutter speed according to the drive signal 142, read outs the pixel signal produced by the image pickup device, and outputs the pixel signal representative of the image of the object to an output 144. The photo-electric converter unit 126 is constituted of, for example, a three-plate optical system having three units of solid-state image pick-up devices corresponding to three primary colors. These solid-state image pick-up devices may generate pixel signals to reproduce an image quality having about nine hundred thousand pieces of effective pixels and corresponding to a HDTV (High Definition TV). The output 144 of the photo-electric converter unit 126 is connected to the projection image processing unit 132 of the control unit 112.

The driving mechanism 128 serves to change a position of the shooting lens system 122 provided on the camera 110 under control of the camera control unit 130. The driving mechanism 128 is provided with, for example, an AF (Automatic Focusing) motor (not illustrated) for moving the shooting lens system 122. The AF motor is rotatively driven in accordance with a drive signal supplied from the camera control unit 130. The AF motor serves to move forwards or backwards the shooting lens system 122 through an interlocking member such as an AF (Automatic Focusing) ring.

The camera control unit 130 comprises a control circuit for controlling and driving the stop 124, the photo-electric converter unit 126 and the driving mechanism 128, which are equipped on the camera 110, on the basis of a control signal produced in the control unit 112. The camera control unit 130 generates, on the basis of a control signal 146 from the control circuit 138, a drive signal 140 to define a stop value through driving the stop 124 and a drive signal 142 to define a shutter speed through the photo-electric converter unit 126. Further, the camera control unit 130 controls the driving mechanism 128 on the basis of the control signal 146 to define a position of the shooting lens system 122.

Further, the camera control unit 130 serves to detect an operational state of the camera 110 and inform the control unit 112 of the detected information. Specifically, the camera control unit 130 detects the stop value as to the stop 124, the shutter speed as to the photo-electric converter unit 126, and the position of the shooting lens system 122 involved in the driving mechanism 128, and outputs the detected information data to the output line 146.

Furthermore, the camera control unit 130 serves to perform an automatic exposure and an automatic focusing at the time of a pre-shooting. For example, to perform the pre-shot for forming a pre-shot image, the camera control unit 130 calculates an exposure value for an image of an object on the basis of an pixel signal formed in the photo-electric converter unit 126, and determines a stop value and a shutter speed involved in the pre-shooting on the basis of the determined exposure value. In addition, the camera control unit 130 measures a distance to the camera subject and determines a position of the shooting lens system 122 involved in the pre-shooting. Thus, the camera control unit 130 controls the stop 124, the photo-electric converter unit 126 and the driving mechanism 128 so as to implement those determined stop value, shutter speed and position of the shooting lens system 122.

The projection image processing unit 132 of the control unit 112 comprises a process circuit for practicing a predetermined signal treatment for pixel signals generated from the photo-electric converter unit 126 and for amplifying the pixel signals to a desired level. The projection image processing unit 132 produces a projection image signal, for example, in such a manner that the pixel signal output from the photo-electric converter unit 126 is subjected to the color correction and outline correction treatments. The thus obtained pixel signal is subjected to a projection image signal processing such as addition of a blanking signal and a white clipping. Further, the projection image processing unit 132 converts the produced projection image signal into a digital signal and outputs the image data in the form of digital value to an output 148. The output 148 of the projection image processing unit 132 is connected to the look-up table 134.

The look-up table 134 comprises a correction circuit for correcting image data produced in the projection image processing unit 132, having a conversion table for deriving an output signal according to the input level, which is constituted of a memory device, for example, a Read Only Memory (ROM). The look-up table 134 performs a γ-correction for image data appearing on the input 148 and outputs the corrected image data to an output 150. An output of the look-up table 134 is connected to the frame memory 136 via the line 150.

The frame memory 136 comprises a memory circuit for storing image data representative of a frame of image. For example, the frame memory 136 has predetermined storage areas adapted for sequentially storing image data appearing on the line 150 in units of frames. The frame memory 136 sequentially reads out the image data from the storage areas and outputs the same via a bus 152 to the control circuit 138.

The control circuit 138 comprises a circuit for providing such a control that information formed in the camera 110 is processed and transferred to the processing apparatus 114, while the camera 110 is controlled in accordance with the information transferred from the processing apparatus 114. Specifically, the control circuit 138 identifies the operational state of the camera 110 detected by the camera control unit 130 and transmits to the processing apparatus 114 information representative of the identified operational state. Further, the control circuit 138 reads out the image data from the frame memory 136, and processes the read image data to form image data representative of a pre-shot image available for an automatic focusing. The control circuit 138 is responsive to the instruction signal 154 to perform a reduction processing in which a size of an image represented by the image data stored in the frame memory 136 is reduced to one-eighth, and produces an image data representative of a pre-shot image for display on the display unit 116 which is connected to the processing apparatus 114. The produced image data representative of a pre-shot image is output to the output 154 which is connected through, for example, a SCSI bus 154 which is adapted to a SCSI standard, to the processing apparatus 114. The control circuit 138 produces a control signal to cause the camera 110 to a photograph (an image shooting and a pre-shooting) and a pre-focusing in accordance with an instruction signal transferred from the processing apparatus 114. The produced control signal is output via the line 146 to the camera control unit 130 of the camera 110.

The processing apparatus 114 produces an instruction signal to control the camera 110 in accordance with the operational condition by an operator and comprises a computer system constituted of a personal computer. The processing apparatus 114 provides such a control that an image representing an operating frame useful for controlling the camera 110 is displayed on a display screen of the display unit 116 connected to line line 160, while a pre-shooting and a take shooting are conducted, and a pre-shot image formed through the pre-shooting is displayed in a preview picture area which is set up within the operating frame.

The processing apparatus 114 produces an instruction signal to designate a position of the shooting lens system 122 on the basis of the image data representative of the pre-shot image so that a target portion of the object is within a depth of field when the shooting is performed, and an additional instruction signal to designate a stop value and a shutter speed which are corrected in such a manner that a target portion of the object is within a depth of field. The produced instruction signals are output on the line 154 to the control circuit 138 of the control unit 112. In the processing apparatus 114, the above mentioned control is effected in accordance with the operational information entered by an operator on the basis of the operating frame displayed on the display unit 116. More in detail, connected to an input 162 of the processing apparatus 114 is the input unit 118, such as a keyboard and a mouse, for detecting the operating state by an operator, so that the processing apparatus 114 produces an instruction signal to control the camera 110 on the basis of the operational information detected by the input unit 118 to perform a pre-shooting for determining a position of the shooting lens system 122 for an image shooting.

Further, the processing apparatus 114 sets up a focusing frame to focus on a target position of a pre-shot image obtained through the pre-shooting in accordance with the operational information detected by the input unit 118. The processing apparatus 114 serves to determine a focusing state of the pre-shot image involved in the set up focusing frame, and identify the position of the shooting lens system 122 when the focusing state is detected.

The processing apparatus 114 also serves to determine an optimum position of the shooting lens system 122 at the time of the shooting and a stop value of the stop 124 on the basis of lens position information representative of the position of the shooting lens system 122 at the time when the focusing state is detected. The processing apparatus 114 has, for example, a ROM for storing a plurality of pieces of information as to the depth of field involved in the camera distances each corresponding to the associated stop value (F-number), and determines a target position of the shooting lens system 122 in such a manner that the distance represented by the identified lens position information is included in the depth of field corresponding to the associated stop value. In this case, when the identified lens position information is not in the depth of field with the associated stop value, the processing apparatus 114 determines a target position of the shooting lens system 122 in such a manner that the distance represented by the identified lens position information is included in the depth of field corresponding to the stop value which is stopped down by one step. Thus, the processing apparatus 114 produces an instruction signal 154 to instruct to the control unit 112 the determined position of the shooting lens system 122, the stop value and the shutter speed involved in the stop value. Further, the processing apparatus 114 produces an additional instruction signal to control the camera 110 on the basis of the operational information detected in the input apparatus 118, and performs the image shooting. In the image shooting, the processing apparatus 114 performs a predetermined processing so that image data formed in the camera 110 is recorded in the information recording medium and an image represented by the image data is formed on the recording medium. Connected to the SCSI bus 154 to which the output of the processing apparatus 114 is connected is, for example, the image recording apparatus 120 and the image printing apparatus 121.

Figure 12:
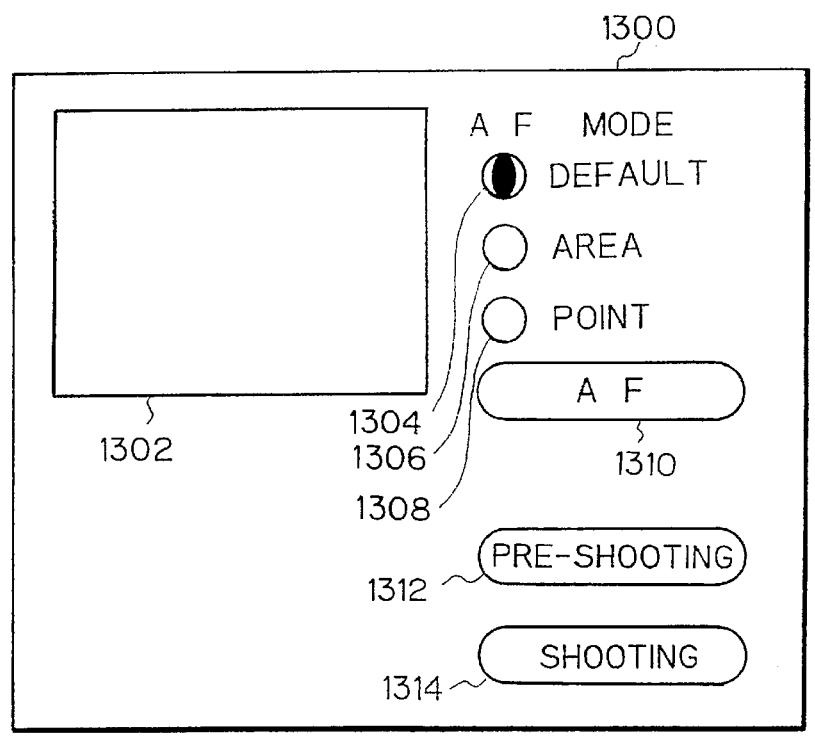
FIGS. 12–17 are views each showing an example of an operating frame useful for understanding the additional embodiment of the present invention.

The processing apparatus 114 produces image data to display on the screen of the display unit 116, for example, an operating frame 1300 as shown in FIG. 12. Specifically, the operating frame 1300 is provided with a preview picture area 1302, at the left hand side, which is available for displaying the pre-shot image representing the reduced image of the image photographed by the camera 10, which reduced image is formed through the reduction by the control unit 112. Above at the right hand side of the operating frame 1300, there are disposed a default button 1304, an area button 1306 and a point button 1308, which are each a focusing button for selecting a focusing mode (AF mode). Below these focusing buttons there is disposed an AF (Automatic Focusing) button 1310 for starting the focusing in accordance with the focusing mode selected by the focusing button. Down at the right hand side of the operating frame 1300, there are disposed a pre-shooting button 1312 for beforehand performing an image pickup of an image of an object in order to determine a focusing area, and a shooting button 1314 for performing a image shooting on the basis of information calculated through the focusing. The processing apparatus 114 outputs to the output 160 image data representative of the formed operating frame 1300.

Now referring to FIGS. 11A and 11B, the processing apparatus 114, the camera control unit 130 in the camera 110 and the control circuit 138 in the control unit 112 will be described more in details hereinafter.

Figure 11B:
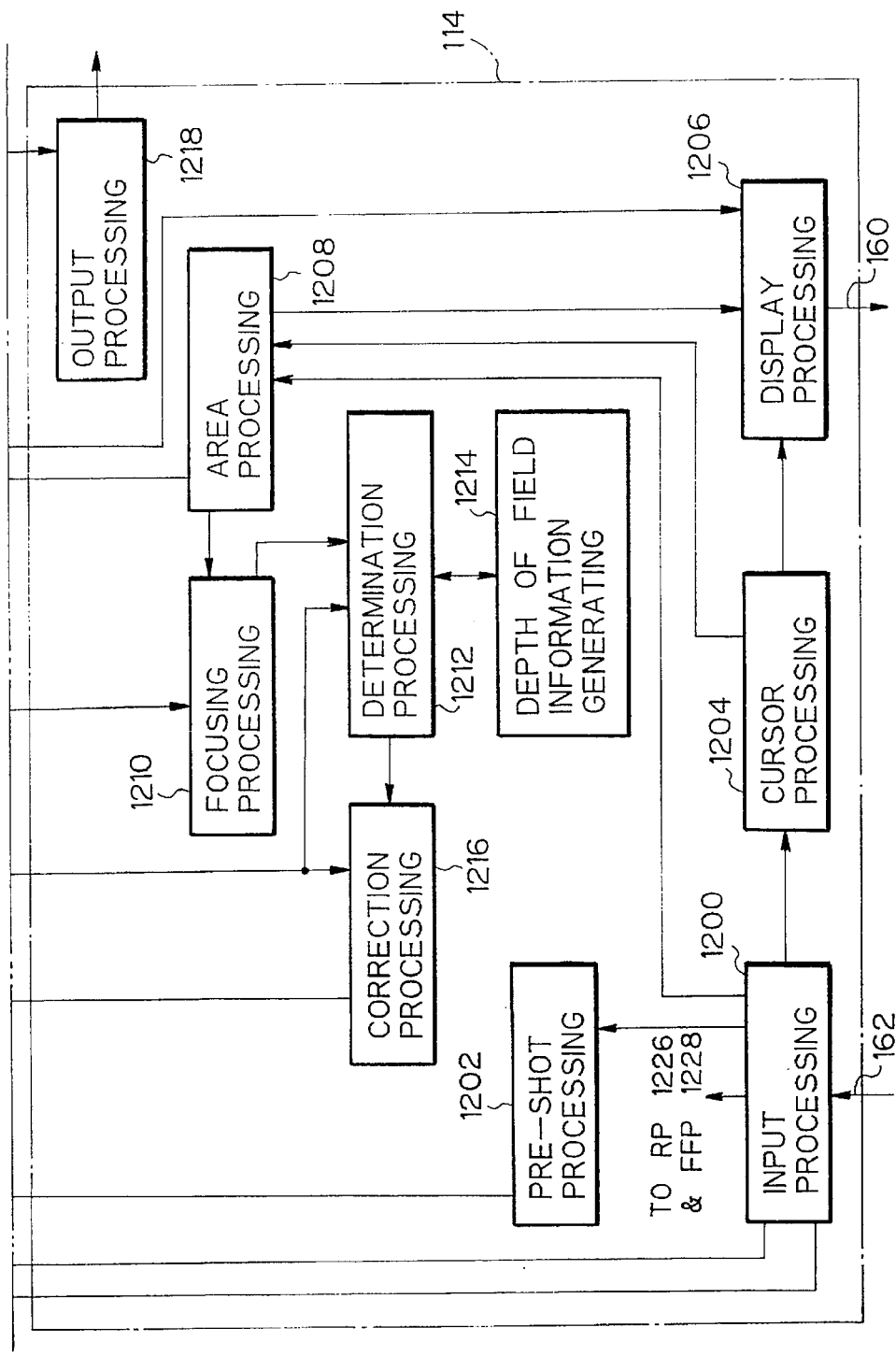

In FIGS. 11A and 11B, there is shown a functional structure of the processing apparatus 114, the control circuit 138 and the camera control unit 130. The processing apparatus 114 comprises an input processing unit 1200, a pre-shot processing unit 1202, a cursor processing unit 1204, a display processing unit 1206, an area processing unit 1208, a focusing processing unit 1210, and a determination processing unit 1212, a depth of field information generating unit 1214, a correction processing unit 1216 and an output processing unit 1218. The control circuit 138 comprises a photographic processing unit 1220, a scan instruction processing unit 1222, a status identification processing unit 1224, a read processing unit 1226 and a frame forming processing unit 1218. The camera control unit 130 comprises an automatic control unit 1230, a transitive control unit 1232, a drive processing unit 1234 and a status detection processing unit 1236.

The input processing unit 1200 recognizes operational information representing the operating state by an operator, which information is provided from the input unit 118 through the connection line 162, and informs the associated function units of the recognized information. More in detail, the input processing unit 1200 recognizes operational information representing the selected states of the respective buttons which have been indicated on the operating frame 1300, and further operational information representing an indication of co-ordinates within the operating frame 1300, corresponding to the operating frame 1300 formed in the display processing unit 1206 which will be described later, and supplies the recognized operational information of messages to the pre-shot processing unit 1202, the cursor processing unit 1204, the area processing unit 1208, the photographic processing unit 1220, the read processing unit 1226 and a frame forming processing unit 1228. For example, the input processing unit 1200 identifies the operational information inputted to the input 162, and informs the read processing unit 1226 of a read instruction signal to read the image data stored in the frame memory 136, and, in addition, informs the frame forming processing unit 1228 of a forming instruction signal to form the pre-shot image.

The pre-shot processing unit 1202 performs a setting for forming a pre-shot image based on the operational information identified in the input processing unit 1200. Upon receipt of the operational information representative of the fact that the pre-shooting button 1312 is selected in a state that the default button 1304 is selected, the pre-shot processing unit 202 sets up initial information to form the pre-shot image, and informs the photographic processing unit 1220 of an instruction signal corresponding to the setting initial information.

The cursor processing unit 1204 issues cursor information representative of a cursor for designating a target position on the operating frame 1300 on the basis of the operational information transmitted from the input processing unit 1200. Specifically, the cursor processing unit 1204 issues the cursor information including position information representative of a position of the cursor on the operating frame 1300 in accordance with the operational information detected in the input processing unit 1200. The cursor processing unit 1204 informs the display processing unit 1206 and the area processing unit 1208 of the issued cursor information.

The display processing unit 1206 provides such a processing that image data representative of the operating frame 1300 as shown in FIG. 12 is produced and displayed on the display unit 116. In addition, a pre-shot image, which is represented by image data produced in the frame forming processing unit 1228 which will be described later, is displayed in the preview picture area 1302 on the operating frame 1300. The display processing unit 1206 causes an image of the cursor represented by cursor information sent out from the cursor processing unit 1204 to be displayed the operating frame 1300 on the basis of the cursor information. Further, the display processing unit 1206 provides such a processing that image data, which causes an image representative of area information representing a focusing frame set up in the area processing unit 1208 to be displayed on the display unit 116, is issued on the basis of the area information, and an image represented by the issued image data is displayed in the preview picture area 1302. The display processing unit 1206 outputs the image data representing the image to be displayed on the operating frame 1300.

Figure 14:
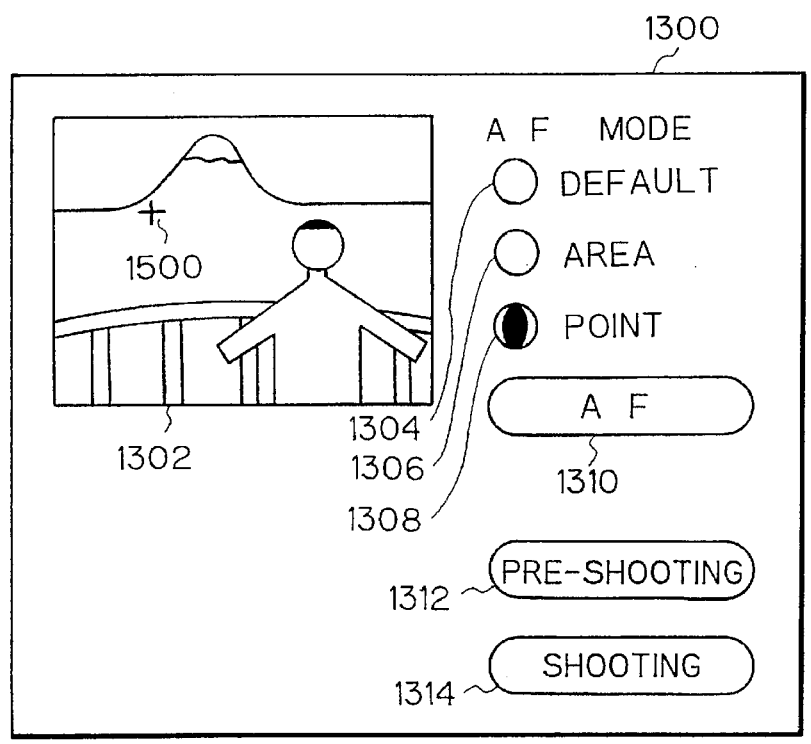

The area processing unit 1208 sets up a focusing frame to designate a focusing area a target focusing target involved in a pre-shot image formed in the frame forming processing unit 1228 which will be described latter. Specifically, the area processing unit 1208 produces area information representing a focusing frame involved in a pre-shot image on the basis of the operational information detected by the input processing unit 1200 and the the cursor position information informed by the cursor processing unit 1204. For example, when the operational information detected by the input processing unit 1200 indicates that the point button 1308 is selected, the area processing unit 1208 produces the area information which causes a cross shaped focusing frame 1500, as shown in FIG. 14, representing an area to be measured by a point focusing to be displayed in the the preview picture area 1302. In this case, the area processing unit 1208 produces the area information designating a predetermined area expanding with a crossing point of the cross shaped mark of the focusing frame 1500 in the center.

Figure 16:
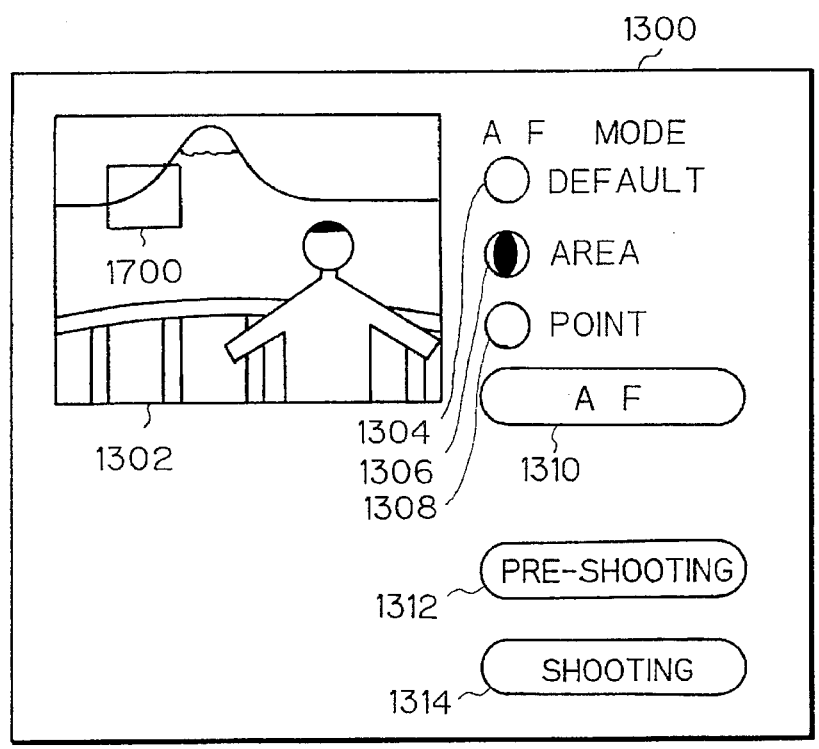

When the area button 1306 is selected, the area processing unit 1208 produces the area information which causes a quadrangle of focusing frame 1700, as shown in FIG. 16, representing an area to be measured by an area focusing to be displayed in the the preview picture area 1302. In this case, the area processing unit 1208 produces the area information designating a range within a frame of the focusing frame 1700. With respect to individual pieces of the area information representative of the focusing frame 1500 and the focusing frame 1700, respectively, it is acceptable that a plurality of pieces of area information are produced in compliance with the identified operational information. The area processing unit 1208 may change a size of the focusing frame 1700 to be formed in accordance with the operational information identified in the input processing unit 1200. The formed area information is transmitted to the display processing unit 1206. Further, the area processing unit 1208 may extract image data involved in the pre-shot image corresponding to the formed area information. The extracted image data is transferred to the focusing processing 1210.

The focusing processing unit 1210 produces lens position information representative of a position of the shooting lens system 122 in focus on the basis of the image data extracted by the area processing unit 1208. Specifically, the focusing processing unit 1210 determines a focusing state of the image represented by the image data corresponding to a plurality of pieces of area information extracted by the area processing unit 1208 on the basis of the same image data. For example, when the input processing unit 1200 identifies operational information indicating that the AF button 1310 is selected, and in addition when the plurality of image data extracted in the area processing unit 1208 are transferred, the focusing processing unit 1210 issues contrast information corresponding to the contrast of the image represented by the transferred respective image data, and decides a state in which the issued contrast information becomes maximum as the focusing state. The focusing processing unit 1210 produces lens position information representative of the determined position of the shooting lens system 122 in focus on the basis of the lens position information as to the shooting lens system 122 transferred from the status identification processing unit 1224 of the controller 112, and transmits the produced lens position information to the determination processing unit 1212.

The determination processing unit 1212 determines an optimum position of the shooting lens system 122 on the basis of a plurality of pieces of position information as to the shooting lens system 122 in focus which are produced in the focusing processing unit 1210 and information such as the stop value (F-number) of the associated stop 124. Specifically, the determination processing unit 1212 determines position information representative of an optimum position of the shooting lens system 122 and the stop value on the basis of a plurality of pieces of lens position information identified in the focusing processing unit 1210 and the stop value informed by the status identification processing unit 1224 of the controller 112, referring to information as to the depth of field issued from the depth of field information generating unit 1214 which will be described later. Further, the determination processing unit 1212 determines a position of the shooting lens system 122 at which a distance of an object is included in the depth of field and the associated stop value, and transmits the determined lens position information and stop value of the stop 124 to the correction processing unit 1216.

Figure 19:
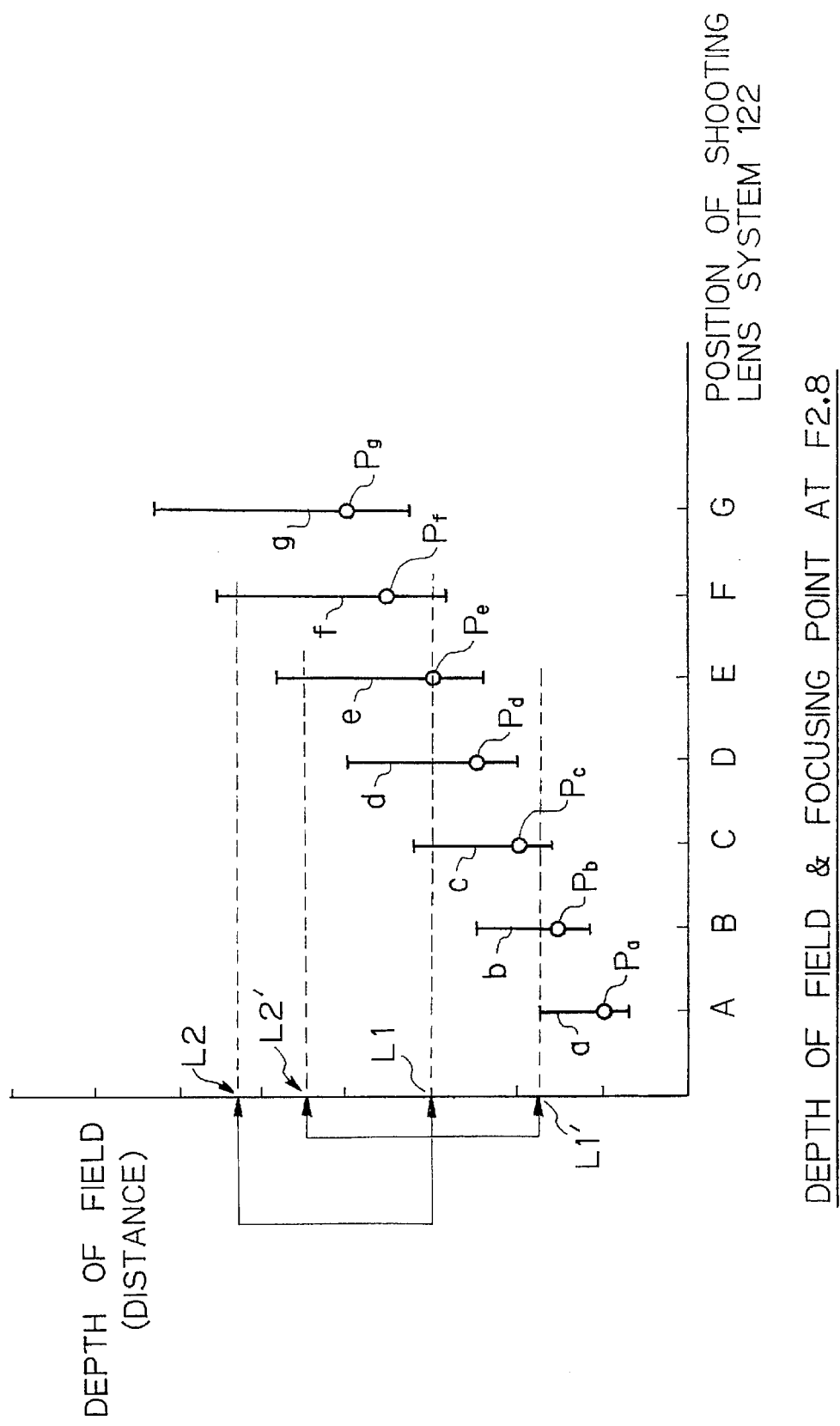
FIG. 19 is a view illustrating an example of information as to a depth of field, which information is generated from an unit (shown in FIG. 11) for generating information involved in a depth of field.

The depth of field information generating unit 1214 serves to issue on each stop value for the stop 124 information as to the depth of field representative of the depth of field involved in each individual position of the shooting lens system 122. The depth of field information generating unit 1214 may be preferably constituted of a memory device, for example, a Read Only Memory (ROM) having a predetermined storage area in which information as to the depth of field is beforehand stored. The information as to the depth of field, which is generated from the depth of field information generating unit 1214, is defined by parameters such as a focal length of the shooting lens system 122, a stop value, a distance to the object (a position of the shooting lens system), and a tolerance of the out-of-focus image. The information as to the depth of field in the present embodiment is constituted of, as conceptually shown in FIGS. 19 and 20, numerical data representative of values for ranges (a)–(g) of depth of field corresponding to positions (A)–(G) of the shooting lens system 122 and values for focusing positions (Pa–Pg) each representative of a distance to the object in focus corresponding to the associated position of the shooting lens system 122. The information as to the depth of field is constituted of a plurality of data groups on each stop value of the stop 124. FIGS. 19 and 20 show exemplarily information as to the depth of field involved in the stop value F 2.8 and information as to the depth of field involved in the stop value F 4.0, respectively. In FIGS. 19 and 20, for the purpose of simplification of the explanation, the positions of the shooting lens system 122 are provided with seven points (A)–(G). However, the number of positions of the shooting lens system 122 is not restricted. It is acceptable that the depth of field information generating unit 1214 produces the information as to the depth of field at desired positions of the shooting lens system 122. The depth of field information generating unit 1214 informs, on the basis of the lens position information and the stop value supplied by the determination processing unit 1212, the determination processing unit 1212 of information as to the depth of field representative of a focusing position corresponding to the position of the shooting lens system 122 in a case where the distance corresponding to the lens position information is within the depth of field, the depth of field involved in the focusing position, and the associated stop value.

The correction processing unit 1216 serves to correct the photographic condition for an image shooting on the basis of the lens position information and the stop value determined in the determination processing unit 1212. Specifically, the correction processing unit 1216 corrects the lens position information supplied by the status identification processing unit 1224 on the basis of the lens position information involved in the focusing position determined in the determination processing unit 1212. Further, the correction processing unit 1216 corrects the stop value and shutter speed supplied by the status identification processing unit 1224 on the basis of the stop value determined in the determination processing unit 1212. In this case, when the stop value determined in the determination processing unit 1212 is different from the stop value informed by the status identification processing unit 1224, the correction processing unit 1216 corrects the shutter speed so as to obtain the same exposure value. Thus, the correction processing unit 1216 produces an instruction signal to instruct the corrected shutter speed, stop value and lens position, and transmits the produced instruction signal to the photographic processing unit 1220 of the control unit 112.

The output processing unit 1218 serves to convert image data output from the control unit 112 to data compatible with a data input format of the image recording apparatus 120 or the image data printing apparatus 121 which are connected to the SCSI bus 154. Specifically, the output processing unit 1218 converts image data representative of the shot image read out from the frame memory 136 in the read processing unit 1226 of the control unit 112 into a predetermined format of data. For example, when image data representative of the shot image output from the control unit 112 is outputted to the image recording apparatus 120, the output processing unit 1218 performs a predetermined compression processing for the image data to produce storage recording data in compressed form. On the other hand, when image data representative of the shot image output from the control unit 112 is output to the image printing apparatus 120, the output processing unit 1218 performs a processing of color correction, color conversion, etc. for the image data to produce recording data for recording an image represented by the image data. The produced recording data are outputted to the output 154.

The photographic processing unit 1220 of the control unit 112 controls the camera 110 on the basis of information transferred from the processing apparatus 114. Upon receipt of initial information from the pre-shot processing unit 1202, the photographic processing unit 1220 produces a photographic instruction signal to form a pre-shot image. The photographic processing unit 1220 informs the automatic control unit 1230 of the camera control unit 130 of the produced photographic instruction signal. Further, upon receipt of operational information representative of the fact that the shooting button 1314 identified in the input processing unit 1200 is selected, the photographic processing unit 1220 produces a photographic control signal to perform a photographic control for forming a shot image of a take. In this case, the photographic processing unit 1220 produces the photographic control signal based on the instruction signal indicating the photographic condition informed by the correction processing unit 1216. The photographic control signal produced in the shooting is transmitted to the transitive control unit 1232 of the camera control unit 130.

The scan instruction processing unit 1222 produces a control signal to provide such a control that the position of the shooting lens system 122 is moved in accordance with operational information identified in the input processing unit 1200 to perform a pre-focus for recognizing the position of the shooting lens system 122 in focus. Specifically, upon receipt of operational information indicating that the AE button 1310 is selected, the scan instruction processing unit 1222 produces a pre-focus control signal to move the position of the shooting lens system 122 from a position corresponding to a minimum camera distance to a position corresponding to an infinite camera distance. The produced control signals are transmitted to the transitive control unit 1230 of the camera control unit 130.

The status identification processing unit 1224 identifies information indicating the state of the camera 110 informed by the camera control unit 30 and informs the processing apparatus 114 of the identified information- Specifically, the status identification processing unit 1224 identifies information indicating the position of the shooting lens system 122, the stop value as to the stop 124 and a shutter speed which are detected in the status detection processing unit 1236 of the camera control unit 130. The identified information is transmitted to the focusing processing unit 1210, the determination processing unit 1212 and the correction processing unit 1216.

The read processing unit 1226 reads out image data stored in the frame memory 136 on the basis of operational information identified in the input processing unit 1200. Specifically, the read processing unit 1226 reads out image data stored in the frame memory 136, which data is involved in the pre-shot image, upon receipt of operational information indicating that either the pre-shooting button 1312 or the AF button 1310 is selected, and transfers the thus read out image data to the frame forming processing unit 1228. When the input processing unit 1200 identifies operational information indicating that the shooting button 1314 is selected, the read processing unit 1226 reads out image data stored in the frame memory 136, and transfers the thus read out image data to the output processing unit 1218.

Figure 13:
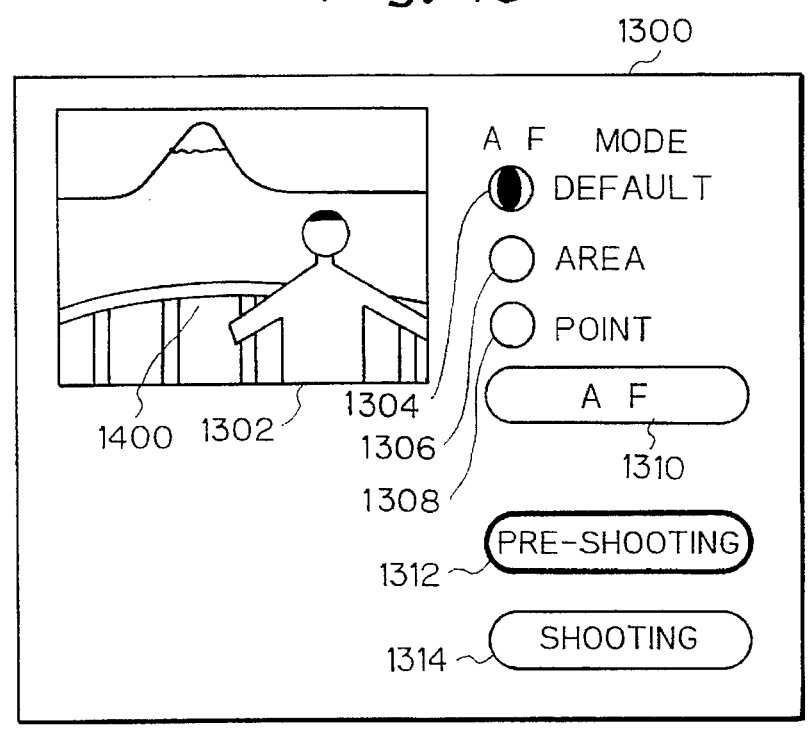

The frame forming processing unit 1228 processes image data transmitted from the read processing unit 1226 to produce other image data representative of a pre-shot image which is reduced in a size of an image represented by the image data read out in the read processing unit 1226. Specifically, when the input processing unit 1200 detects operational information indicating that the pre-shooting button 1312 is selected, the frame forming processing unit 1228 practices a thinning treatment for the image data read out in the read processing unit 1226, for example, with respect to the horizontal direction and the vertical direction of the image, so that a size of an image represented by the image data is reduced. The frame forming processing unit 1228 produces image data representing a pre-shot image which is reduced to a scale of one-eighth of the size of the image represented by the image data. The frame forming processing unit 1228 produces image data representative of a pre-shot image 1400, for example, as shown in FIG. 13, which is displayed in the preview picture area 1302 upon reduction of the image represented by the image data, and transmits the thus produced image data to the display processing unit 1206 and the area processing unit 1208.

The automatic control unit 1230 of the camera control unit 130 performs a photographic processing on the basis of information issued in the camera 110. Specifically, when the pre-shooting is conducted, the automatic control unit 1230 performs an automatic processing for an automatic focusing for adjusting a position of the shooting lens system 122 in accordance with the camera subject, and an automatic exposure for determining a stop value as to the stop 124 and a shutter speed involved in the photo-electric converter unit 126. In response to the photographic instruction signal informed by the photographic processing unit 1220 of the control unit 112, the automatic control unit 1230 performs an automatic processing so as to determine a position of the shooting lens system 122, the stop value and the shutter speed for the pre-shooting. The determined photographic information factors are transmitted to the drive processing unit 1234.

The transitive control unit 1232 performs a processing for control of the camera 110 under control of the control unit 112. Specifically, when the shooting is conducted, the transitive control unit 1232 issues, on the basis of the photographic control signal informed by the photographic processing unit 1220, photographic information indicating the position of the shooting lens system 122, a stop value as to the stop 124, and a shutter speed involved in the photo-electric converter unit 126. Further, the transitive control unit 1232 issues, on the basis of the pre-focus control signal produced in the scan instruction processing unit 1222, control information to move the shooting lens system 122. The produced photographic information and control information are transmitted to the drive processing unit 1234.

The drive processing unit 1234 produces drive signals to drive the stop 124, the photo-electric converter unit 126 and the driving mechanism 128, on the basis of the photographic information determined in the automatic control unit 1230 and the transitive control unit 1232. The produced drive signals are supplied to the stop 124, the photo-electric converter unit 126 and the driving mechanism 128, respectively. Further, the drive processing unit 1234 produces an additional drive signal to perform the pre-focus through movement of the shooting lens system 122 on the basis of the control information informed by the transitive control unit 1232. The produced drive signal is supplied to the driving mechanism 128. In this case, the drive processing unit 1234 produces the drive signals to drive the stop 124 and the photo-electric converter unit 126, and supplies the produced drive signals to the stop 124 and the photo-electric converter unit 126, respectively.

The status detection processing unit 1236 detects an operational state of the camera 110. Specifically, the status detection processing unit 1236 detects, on the basis of the drive signals produced in the drive processing unit 1234, a position of the shooting lens system 122, a stop value as to the stop 124, and a shutter speed involved in the photo-electric converter unit 126 according to the operation of the camera 110. The detected information is transmitted to the status identification processing unit 1224 of the control unit 112. It is preferable that the status detection processing unit 1236 directly detects information concerning a position of the shooting lens system 122, a stop value as to the stop 124 and the like.

Again, referring to FIG. 10, the display unit 116, the input unit 118, and the image recording apparatus 120 are similar to the display unit 16, the input unit 18, and the image recording apparatus 14 shown in FIG. 1, respectively, and thus the redundant description will be omitted. The image printing apparatus 121 is a printer for forming on a recording medium such as a paper sheet an image represented by image data processed by the processing apparatus 114.

Figure 18:
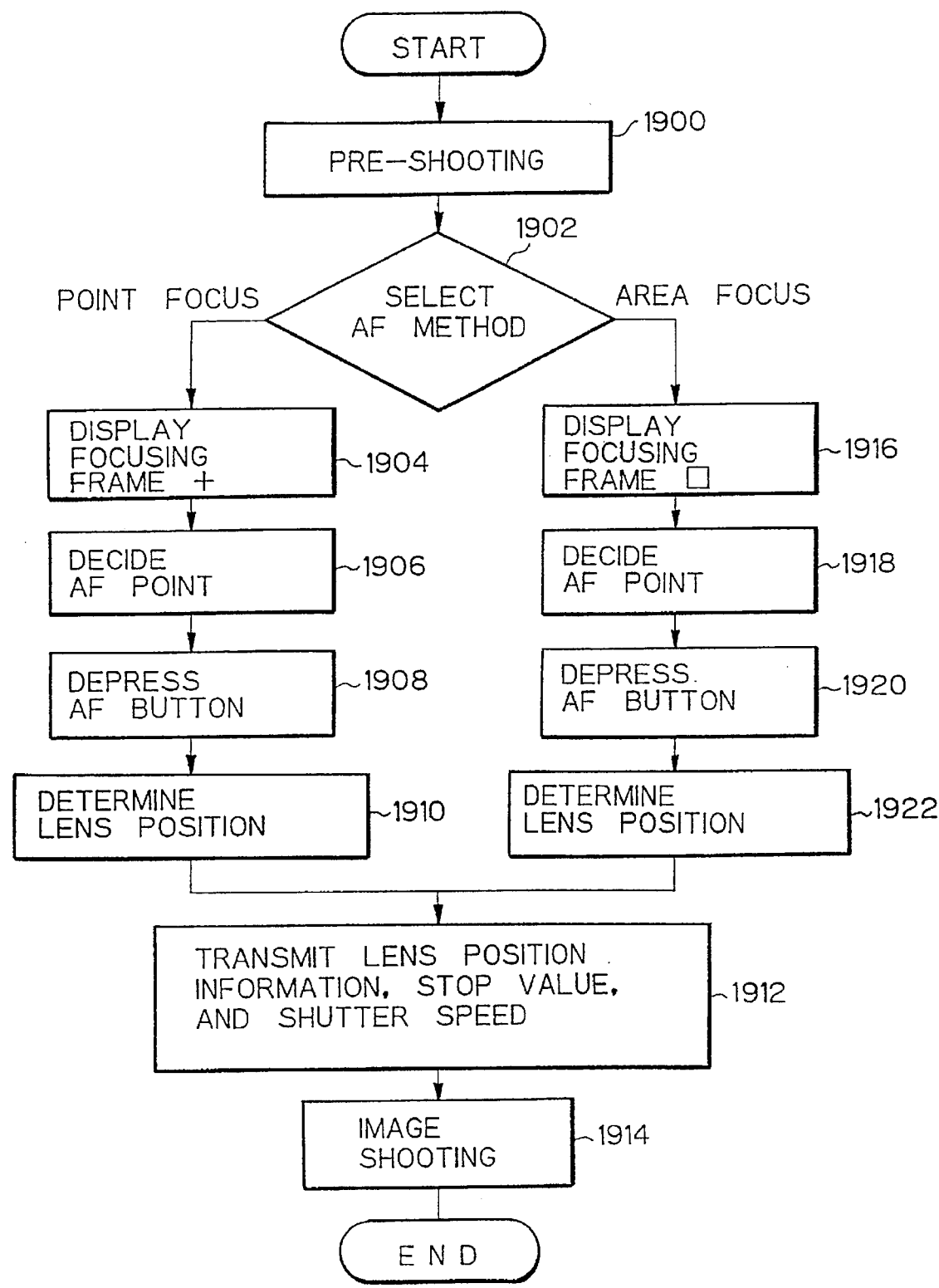
FIG. 18 is a flowchart useful for understanding the operation of the camera system according to the additional embodiment of the present invention.

Next, an operation of the camera system 100 will be described referring to FIG. 18 showing an operational flowchart for the camera system 100. First, in a state that the camera 110 is set up toward an object, and a luminous flux incident through the shooting lens 122 and the stop 124 is formed on the image-forming plane of the photo-electric converter unit 126, outputted to the output 160 is image data representative of the operating frame 1300 shown in FIG. 12 which is produced in the display processing unit 1206 of the processing apparatus 114. The outputted image data is sent out to the display unit 116, so that the operating frame 1300 is displayed on a display screen thereof.

Referring to FIG. 18, in step 1900, when the pre-shot button 1312 is selected in the operating frame 1300 through an operation of the input apparatus 118, the input processing unit 1200 detects the operational state, and transmits operational information representative of the operational state to the pre-shot processing unit 1202. The pre-shot processing unit 1202 transmits to the photographic processing unit 1220 initial information for image pickup of a pre-shot image. The operational information is also transmitted to the cursor processing unit 1204 to form cursor information. The formed cursor information is transmitted to the display processing unit 1206, so that a cursor is displayed on the pre-shooting button 1312. Incidentally, in FIGS. 12 to 17, the cursor is omitted in illustration.

Upon receipt of the initial information, the photographic processing unit 1220 produces a photographic instruction signal according to the initial information, and transmits the produced photographic instruction signal to the automatic control unit 1230 of the camera control unit 130. Upon receipt of the photographic instruction signal, the automatic control unit 1230 performs an exposure metering and a focusing for a pre-shooting so as to determine the shutter speed and stop value obtained through the exposure metering, and the position of the shooting lens system 122 obtained through the focusing. These information factors determined in the automatic control unit 1230 are transmitted to the drive processing unit 1234 to produce the drive signals. The drive processing unit 1234 drives the driving mechanism 128 for moving a position of the shooting lens system 122, the stop 124 and the photo-electric converter unit 126 in accordance with the drive signals produced in the drive processing unit 1234. When the stop 124, the photo-electric converter unit 126 and the driving mechanism 128 are operated, the photo-electric converter unit 126 generates a pixel signal 144 representative of an image of an object, and transmits the pixel signal 144 to the projection image processing unit 132. In the projection image processing unit 132, the received pixel signal 144 is amplified, subjected to a correction processing, and converted into image data in form of the digital value. The image data is transferred via a line 148 to the look-up table 134 to be subjected to a γ-correction. The corrected image data is stored in a storage area of the frame memory 136.

The image data stored in the frame memory 136 is read out with the read processing unit 1226 to which the read instruction signal is transferred from the input processing unit 1200. The frame forming processing unit 1228 practices a reduction processing for the read out image data in which a size of the image is reduced, and produces image data representative of a pre-shot image. The thus produced image data is transferred via a SCSI bus 54 to the display processing unit 1206 and the area processing unit 1208 of the processing apparatus. The image data representative of the pre-shot image, which has been transferred to the display processing unit 1206, is compounded within the preview picture area 1302 disposed in the operating frame 1300. The compounded image data is outputted via a line 160 to the display unit 116 in which as shown in FIG. 13, the pre-shot image represented by the image data is displayed in the preview picture area 1302.

Next, the process goes to step 1902 in which the operational state of the input apparatus 118 is detected. In step 1902, as shown in FIG. 14, if the point button 1308 displayed in the operating frame 1300 is selected, the program proceeds to step 1904, while as shown in FIG. 16, if the area button 1306 is selected, the program proceeds to step 1916.

In step 1904 wherein the point button 1308 is selected, the operational information detected in the input processing unit 1200 is transmitted to the cursor processing unit 1204 in which cursor information is produced on the basis of the operational information. The produced cursor information is transferred to the display processing unit 1206, so that the selected point button 1308 is displayed as shown in FIG. 14. When operational information detected in the input processing unit 1200 is transmitted to the area processing unit 1208, area information is produced in accordance with the operational information. The thus produced area information is transferred to the display processing unit 1206. As a result, there is produced image data representative of a focusing frame 1500 designating an area to conduct a point photometry as to a predetermined zone in the preview picture area 1302, so that the focusing frame 1500 is displayed at the predetermined position in the preview picture area 1302 which is displayed on a display screen of the display unit 116.

Figure 15:
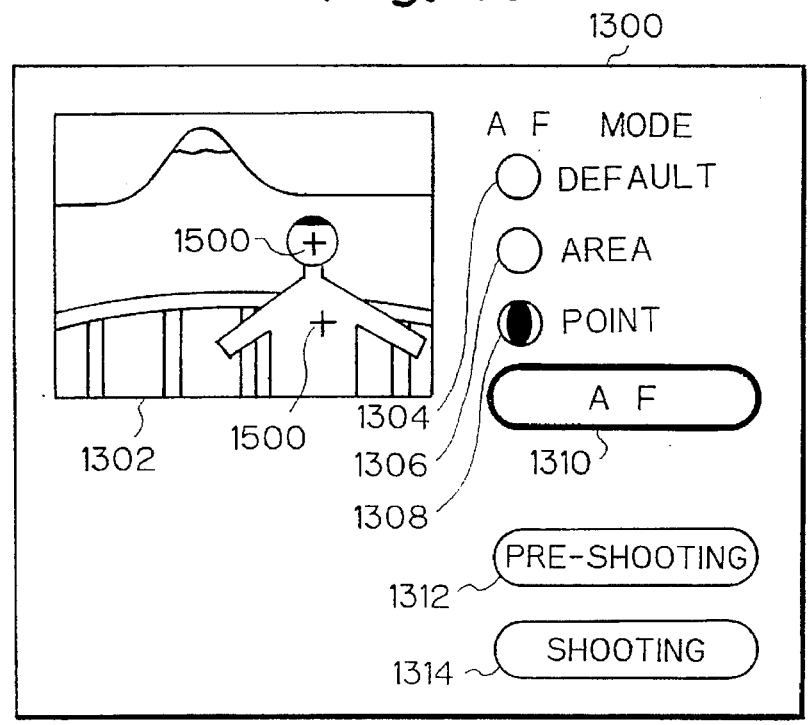

In step 1906, the input apparatus 118 is operated, operational information representative of the operational state of the input apparatus 118 is transmitted to the cursor processing unit 1204, cursor information identified in the cursor processing unit 1204 is transferred to the display processing unit 1206, and the focusing frame 1500 displayed in the preview picture area 1302 is moved to a target position. Further, the cursor information including position information of the focusing frame 1500 is transferred to the area processing unit 1208 which identifies an area on which the point photometry is to be carried out. It is possible to set up a plurality of focusing frames 1500 in accordance with an object. In this case, the procedures in the steps 1904 and 1906 are repeatedly carried out, so that the focusing frames 1500 are indicated in a plurality of desired positions of the pre-shot image, as shown in FIG. 15.

Next, the process goes to step 1908 in which when the AF button 1310 in the operating frame 1300 is selected, the input processing unit 1200 identifies the concerned operational information. The identified operational information is transferred to the scan instruction processing unit 1222 of the control unit 112 to produce a pre-focus control signal for performing a pre-focus. The drive processing unit 1234 produces driving signals to drive the stop 124, the photo-electric converter unit 126 and the driving mechanism 128 on the basis of the produced pre-focus control signal. The camera 110 is driven by the produced driving signals so that the shooting lens system 122 is responsive to the operation of the driving mechanism 128 to move the shooting lens system 122 from a position corresponding to a minimum camera distance to a position corresponding to an infinite camera distance. An image of an object, which is formed on an image-forming plane of the photo-electric converter unit 126 during the movement of the shooting lens system 122, is converted into a pixel signal by the photo-electric converter unit 126 and is transmitted via the output line 144 to the projection image processing unit 132. The pixel signals output from the camera 110 are subjected to a predetermined processing in the control unit 112 to form image data. The formed image data are sequentially stored in the frame memory 136. The image data are sequentially read out from the frame memory 136 with the read processing unit 1226 upon receipt of the read instruction signal from the input processing unit 1200. Next, the image data representative of the pre-shot image are sequentially formed with the frame forming processing unit 1228 upon receipt of the forming instruction signal from the input processing unit 1200. The image data formed in the frame forming processing unit 1228 are transferred to the area processing unit 1208 of the processing apparatus 114.

Next, the process goes to step 1910 in which the area processing unit 1208, which identifies an area to be subjected to the point focusing, extracts the portion corresponding to the identified area from the image data transmitted from the frame forming processing unit 1228. The focusing processing unit 1210 determines the focusing state of the image represented by the extracted image data. Whereas, the status identification processing unit 1224 identifies the position of the shooting lens system 122 which has been detected in the status detection processing unit 1236, and sequentially transfers the identified lens position information to the focusing processing unit 1210. The focusing processing unit 1210 produces lens position information representative of the position of the shooting lens system 122 in focus of the determined image on the basis of the received lens position information, and transmits the thus formed lens position information to the determination processing unit 1212. Upon receipt of the lens position information, the determination processing unit 1212 informs the depth of field information generating unit 1214 of the lens position information and the stop value as to the stop 124 transferred from the status identification processing unit 1224. Upon receipt of the lens position information and the stop value, the depth of field information generating unit 1214 informs the determination processing unit 1212 of numerical data representative of the depth of field and focus position corresponding to the position of the shooting lens system 122. In this case, as shown in FIG. 19, assuming that the lens position information of which the determination processing unit 1212 is informed by the focusing processing unit 1210 is given by two parameters L1 and L2, and the stop value transferred from the status identification processing unit 1224 to the determination processing unit 1212 is F 2.8, the determination processing unit 1212 determines the focusing position Pf and the stop value F 2.8 so that the distances of the object corresponding to the parameters L1 and L2 as to the lens position information are included in the depth of field.

Next, the process goes to step 1912 in which the lens position information, the shutter speed and the stop value, which are informed by the status identification processing unit 1224, are corrected on the basis of the focusing position Pf and the stop value F 2.8 determined in the determination processing unit 1212. In this case, for example, the lens position information informed by the status identification processing unit 1224 is corrected to the lens position information representative of the position of the shooting lens system 122 corresponding to the focusing position Pf. Further, in this case, the stop value determined in the determination processing unit 1212 is the same as that informed by the status identification processing unit 1224. Thus, the stop value and the shutter speed are not corrected. An instruction signal indicating those stop value and shutter speed and the corrected lens position information is transferred to the photographic processing unit 1220. Upon receipt of the instruction signal, the photographic processing unit 1220 produces a photographic control signal to control the position of the shooting lens system 122 in the camera 110, the stop value on the stop 124 and the shutter speed on the photo-electric converter unit 126, and transmits the photographic control signal to the transitive control unit 1232 of the camera control unit 130. Upon receipt of the photographic control signal, the transitive control unit 1232 determines the position of the shooting lens system 122, the stop value on the stop 124 and the shutter speed on the photo-electric converter unit 126, and transmits the photographic information indicating those determined factors to the drive processing unit 1234. Upon receipt of the photographic information, the drive processing unit 1234 produces drive signals to drive the stop 124 and the photo-electric converter unit 126, and the driving mechanism 128, and supplies the produced drive signals to the associated elements, respectively. In this manner, the driving mechanism 128 is operative. As a result, the shooting lens system 122 is moved to a position corresponding to the focusing position Pf, the stop 124 is driven to provide the stop value F 2.8, and the shutter speed on the photo-electric converter unit 126 is controlled.

In step 1914, when the shooting button 1314 is selected, operational information identified in the input processing unit 1200 is transferred to the photographic processing unit 1220. Upon receipt of the operational information, the photographic processing unit 1220 produces a photographic control signal to form a shot image as an image shooting, and transmits the produced photographic control signal to the transitive control unit 1232. Upon receipt of the photographic control signal, the transitive control unit 1232 informs the drive processing unit 1234 of photographic information for conducting a shooting, while maintaining the photographic information of which the drive processing unit 1234 has already been informed. The photo-electric converter unit 126 is operative in response to an output of the drive processing unit 1234 to form a pixel signal representative of an image of an object which is formed on an image-forming plane via the shooting lens system 122 and the stop 124. The formed pixel signal is inputted to the control unit 112. In the control unit 112, the pixel signals are subjected to a predetermined processing through the projection image processing unit 132 and the look-up table, and then stored in the storage area of the frame memory 136.

Whereas, when the read processing unit 1226 receives operational information indicating that the shooting button 1314 is selected, the image data is read out from the frame memory 136, and transferred via the SCSI bus 154 to the output processing 1218 of the processing apparatus 114. In a case where image data issued through the shooting as a take are recorded on a recording medium mounted on the image recording apparatus 120, the image data are subjected to a compression processing through the output processing 1218. When it is wished that an image represented by the image data is printed, the image data are subjected to a correction processing such as color correction through the output processing 1218. The processed image data are transmitted via the SCSI bus 154 to the image recording apparatus 120 and/or the image printing apparatus 120.

In step 1902, if the area button 1306 representative of an area focus is selected, the program proceeds to step 1916. With respect to step 1916 to step 1922, the operation involved in those steps may be the same as that of step 1904 to step 1910 described above, except for the point that the configuration of a focusing frame set up in the area processing unit 1208 and an amount of area information corresponding to the focusing frame are different.

Figure 17:
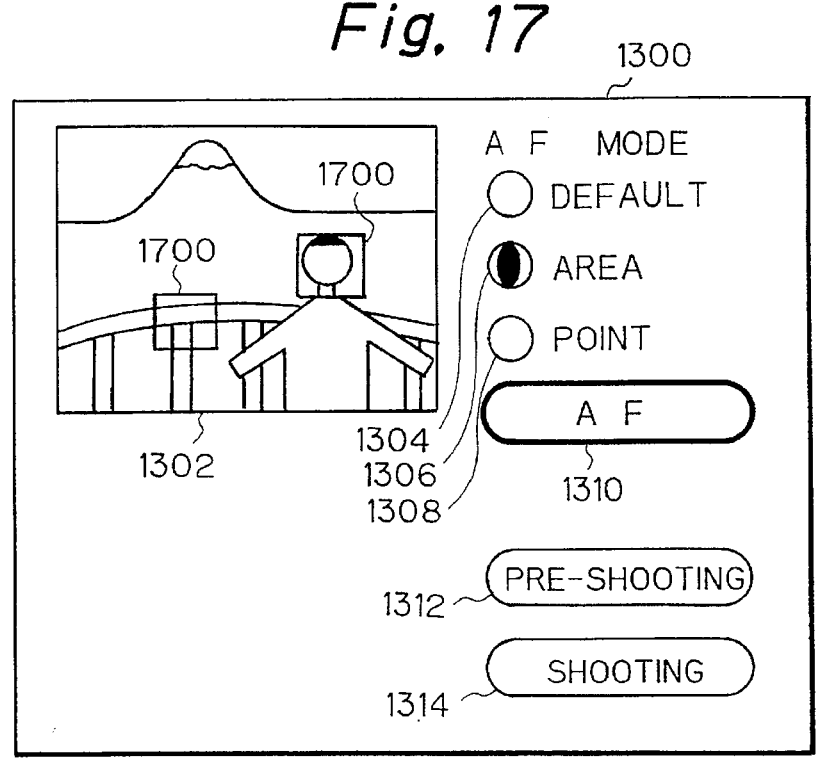

Next, with respect to a case where lens position information, of which the the determination processing unit 1212 is informed by the focusing processing unit 1210, is given by, for example, two parameters L1' and L2' as shown in FIG. 19, the operation in connection with the area focus will be described. Assume that a pre-shot image formed through a pre-shooting is shown, for example, as shown in FIG. 17, the preview image area 1302, and focusing frames 1700 are set up and displayed at a plurality of desired positions of an image.

In step 1922, similar to step 1910 in operation, the area processing unit 1208, which identifies through the operation up to step 1920 an area corresponding to the focusing frame 1700 available for an area focus, extracts the portion corresponding to the identified area from the image data transmitted from the frame forming processing unit 1228. The focusing processing unit 1210 determines the focusing state of the image represented by the extracted image data. Whereas, the status identification processing unit 1224 identifies the position of the shooting lens system 122 which has been detected in the status detection processing unit 1236, and sequentially transfers the identified lens position information to the focusing processing unit 1210. The focusing processing unit 1210 produces lens position information representative of the position of the shooting lens system 122 in focus of the determined image on the basis of the received lens position information, and transmits the thus formed lens position information to the determination processing unit 1212. Upon receipt of the lens position information, the determination processing unit 1212 informs the depth of field information generating unit 1214 of the lens position information and the stop value as to the stop 124 transferred from the status identification processing unit 1224. Upon receipt of the lens position information and the stop value, the depth of field information generating unit 1214 informs the determination processing unit 1212 of numerical data representative of a stop value which permits the distance to the object corresponding to the position of the shooting lens system 122 in focus to be included in the depth of field and a focus position indicating the length adapted to establish the depth of field with the stop value.

In this case, as shown in FIG. 19, assuming that the lens position information of which the determination processing unit 1212 is informed by the focusing processing unit 1210 is given by two parameters L1' and L2', and the stop value transferred from the status identification processing unit 1224 to the determination processing unit 1212 is F 2.8, the subject distances corresponding to the position parameters L1' and L2' can not be included in depth of field in the stop value F 2.8. Thus, the determination processing unit 1212 determines, for example, as shown in FIG. 20, the focusing position Pd and the stop value F 4.0 which is stopped down by one step so that the subject distances corresponding to the parameters L1 and L2 as to the lens position information are included in the depth of field.

Next, the process goes to step 1912 in which the lens position information, the shutter speed and the stop value, which are informed by the status identification processing unit 1224, are corrected on the basis of the focusing position Pd and the stop value F 4.0 determined in the determination processing unit 1212. In this case, for example, the lens position information informed by the status identification processing unit 1224 is corrected to the lens position information representative of the position of the shooting lens system 122 corresponding to the focusing position Pd. Further, the stop value is corrected to the stop value F 4.0 determined in the determination processing unit 1212, and in addition, the shutter speed is corrected to the value corresponding to the corrected stop value. Thereafter, the camera 110 is controlled and driven through the control circuit 138 of the control unit 112 with the corrected position information, stop value and shutter speed. In this case, the shooting lens system 122 is moved by the drive mechanism 128 to a position represented by the lens position information corresponding to the focusing position Pd so that the shooting as a take is conducted.

As described above, according to the present embodiment, it is possible to set up the focusing frame at a desired portion on the basis of a pre-shot image displayed in a preview area. Thus, it is possible to determine an optimum position for a shooting lens system on the basis of information measured in accordance with the focusing frame. Consequently, even in case of photographing upon fixing of the camera on a base such as a tripod, and a copy stand for copying documents, there is no need to start over again the fixing of the camera every operation. Thus, an operability for focusing according to an image of an object is improved.

Further, according to the present embodiment, it is possible, utilizing the depth of field, to implement the automatic focusing in such a manner that a plurality of focusing frames, and all of the objects corresponding to the plurality of focusing frames are in focus.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera system for producing image data representative of an optical image of an object to be photographed, the optical image being incident via a shooting lens system, comprising:

pick-up means for producing pixel signals representative of the optical image through photographing the object;

first control means for controlling said pick-up means and for processing the pixel signals produced in said pick-up means to generate a first image data of the object and a second image data of the object;

second control means for focusing an image of the object on the basis of the first image data, and supplying, to said first control means, an instruction to generate the second image data after said first control means controls said pick-up means in accordance with information obtained by the focusing;

display means for displaying a first image represented by the first image data; and input means for detecting an operational state by an operator to be operated in accordance with the first image displayed on said display means, wherein said first control means controls said pick-up means in accordance with the instruction supplied by said second control means to photographically form the image of the object, and generates the first image data and the second image data, and said second control means identifies operational information representative of the operational state detected by said input means to set up a focusing area on the first image in accordance with the operational information, and implements the focusing for the image of the object in accordance with pixel signals corresponding to the set up focusing area;

wherein said second control means includes input processing means for identifying the operational information representative of the operational state detected by said input means, pre-shot processing means for informing said first control means of an instruction to generate said image data in accordance with the operational information, display processing means for providing such a processing that said first image represented by said first image data processed in said first control means is displayed in accordance with the instruction of said pre-shot processing means, area processing means for setting up an area for focusing in said first image in accordance with the operational information, focusing processing means for detecting a focusing state of the image of the object in accordance with said first image data corresponding to the area set up by said area processing means, and for producing lens position information indicating a position of the shooting lens in the focusing state in accordance with information representative of a state of said pick-up device, said information being transmitted from said first control means, and correction means for instructing said first control means to correct a position of the shooting lens system in accordance with the lens position information.

2. A camera system according to claim 1, wherein said area processing means sets up at least two or more focusing areas for said focusing in accordance with the operational information, said focusing processing means detects a focusing state in a plurality of positions of the image of the object on the basis of image data of associated portions of said plurality of focusing areas, and said correction means instructs said first control means to correct the photographic condition in photograph by said pick-up device in accordance with a state of said pick-up device corresponding to the focusing state.

3. A camera system according to claim 2, wherein said second control means includes means for forming depth of field information representative of a plurality of values of depth of field each corresponding to the associated one of states of said pick-up device on the basis of states of said pick-up device which states are determined in said focusing processing means, and said focusing processing means issues lens position information indicating positions of the shooting lens system at which positions a plurality of positions of the object are included in the depth of field represented by said depth of field information.

4. A camera system according to claim 1, wherein said first control means includes:

photographic processing means for controlling said pick-up device in accordance with an instruction from said second control means;

scan processing means for controlling said pick-up device to perform a pre-focus in accordance with operational information identified in said second control means;

identification processing means for identifying information representative of the operational state of said pick-up device and for informing said second control means of the identified information;

read means for reading image data corresponding to the pixel signals formed in said pick-up device; and frame forming processing means for forming the first image data from the image data read by said read means.

5. A camera system according to claim 1, wherein said controlling of said pick-up means by said first control means includes means for adjusting at least one of a position of the shooting lens system, a stop value of an aperture stop in said pick-up means, and a shutter speed of a shutter in said pick-up means.

6. A camera system according to claim 5, wherein said second control means determines said at least one of said position, said stop value and said shutter speed from pixel signals corresponding to the focusing area and outputs determined parameters to said first control means.

7. A camera system according to claim 6, wherein said first control means controls said pick-up device until parameters of said pick-up device equal said determined parameters output from said second control means.

8. A camera system according to claim 1, wherein said input means further detects an operator selection between generating said first image and generating said second image.

9. A camera system according to claim 1, wherein said focusing area is a point.

10. A camera system according to claim 6, wherein said input means further detects an operator selection between an automatic exposure mode, in which only said stop value and said shutter speed are controlled, and an automatic focus mode, in which all of said stop value, said shutter speed and said position are controlled.

11. A camera system for producing image data representative of an optical image of an object to be photographed, the optical image being incident via a shooting lens system, comprising:

a pick-up device for producing pixel signals representative of the optical image through photographing the object;

first control means for controlling said pick-up device and for processing the pixel signals produced in said pick-up device to generate a first image data of the object and a second image data of the object;

second control means for focusing an image of the object on the basis of the first image data, and supplying, to said first control means, an instruction to generate the second image data after said first control means controls said pick-up device in accordance with information obtained by the focusing;

display means for displaying a first image represented by the first image data; and input means for detecting an operational state by an operator to be operated in accordance with the first image displayed on said display means, wherein said first control means controls said pick-up device in accordance with the instruction supplied by said second control means to photographically form the image of the object, and generates the first image data and the second image data, and said second control means identifies operational information representative of the operational state detected by said input means to set up a focusing area on the first image in accordance with the operational information, and implements the focusing for the image of the object in accordance with pixel signals corresponding to the set up focusing area, wherein said pick-up device includes:

conversion means for converting the optical image which is formed via the shooting lens system into the pixel signals;

a stop for adjusting an incident luminous flux; and camera control means for controlling a position of the shooting lens system, wherein said camera control means includes first operational control means for providing a first control to form the first image data in accordance with an instruction of said first control means;

second operational control means for providing a second control to form the second image data in accordance with a control of said first control means;

drive means for driving said conversion means and said shooting lens system on the basis of the instruction of said first operational control means and the control of said second operational control means; and status detection means for detecting operational states of said conversion means and said shooting lens system to transmit information representative of the detected status of said pick-up device to said first control means, and wherein said second operational control means controls said drive means to move a position of said shooting lens system in accordance with the control of said first control means.

* * * * *